(12) United States Patent
Sone et al.

(10) Patent No.: US 10,984,207 B2
(45) Date of Patent: Apr. 20, 2021

(54) LABEL READING SYSTEM

(71) Applicant: TOYOTA JIDOSHA KABUSHIKI KAISHA, Toyota (JP)

(72) Inventors: Daiji Sone, Toyota (JP); Katsuhiko Nagasawa, Aichi-gun (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 16/574,272

(22) Filed: Sep. 18, 2019

(65) Prior Publication Data

US 2020/0117873 A1 Apr. 16, 2020

(30) Foreign Application Priority Data

Oct. 15, 2018 (JP) .............................. JP2018-194049

(51) Int. Cl.
| | |
|---|---|
| *G06Q 30/00* | (2012.01) |
| *G06Q 90/00* | (2006.01) |
| *G06K 7/10* | (2006.01) |
| *G06K 15/00* | (2006.01) |
| *G06K 7/14* | (2006.01) |
| *G06K 19/06* | (2006.01) |

(52) U.S. Cl.
CPC ....... *G06K 7/1447* (2013.01); *G06K 7/10871* (2013.01); *G06K 7/1443* (2013.01); *G06K 19/06037* (2013.01)

(58) Field of Classification Search
USPC .................................... 235/383, 385, 462.09
See application file for complete search history.

(56) References Cited

U.S. PATENT DOCUMENTS

| | | | | |
|---|---|---|---|---|
| 10,643,038 | B1* | 5/2020 | McCalib, Jr. ...... | H04N 5/23206 |
| 2002/0024598 | A1* | 2/2002 | Kunimitsu .............. | B66C 13/46 348/159 |
| 2005/0140511 | A1* | 6/2005 | Bonnell ................. | G06K 17/00 340/572.7 |
| 2006/0054693 | A1* | 3/2006 | Kawai ................ | G06K 19/0717 235/385 |
| 2006/0290472 | A1* | 12/2006 | Onderko ............ | G06K 7/10336 340/10.1 |

(Continued)

FOREIGN PATENT DOCUMENTS

| | | |
|---|---|---|
| JP | 08-123860 A | 5/1996 |
| JP | 2006-027773 A | 2/2006 |

OTHER PUBLICATIONS

U.S. Appl. No. 16/541,613, filed Aug. 6, 2019.

*Primary Examiner* — Tuyen K Vo
(74) *Attorney, Agent, or Firm* — Oblon, McClelland, Maier & Neustadt, L.L.P.

(57) ABSTRACT

Based on information on a plurality of images taken by a plurality of cameras of a QR-code imaging device, either information that label information has been appropriately acquired or information that the label information has not been appropriately acquired is assigned to each of a plurality of parts boxes placed on a forklift. Then, the information assigned to each parts box is displayed over a corresponding parts box in an image showing the parts boxes. By visually checking the image showing the parts boxes, a worker can easily recognize a parts box of which the label information has not been appropriately acquired.

6 Claims, 15 Drawing Sheets

(56) References Cited

U.S. PATENT DOCUMENTS

| | | | |
|---|---|---|---|
| 2012/0057022 A1* | 3/2012 | Nechiporenko | G06K 9/209 348/135 |
| 2012/0274784 A1* | 11/2012 | Hofman | G06K 9/209 348/169 |
| 2013/0096735 A1* | 4/2013 | Byford | G05D 1/0234 701/2 |
| 2015/0193761 A1* | 7/2015 | Svetal | G07G 1/0036 705/23 |
| 2016/0133026 A1* | 5/2016 | Patel | H04N 13/204 382/154 |
| 2019/0025852 A1* | 1/2019 | Nanda | G06Q 10/087 |

* cited by examiner

LABEL READING SYSTEM

INCORPORATION BY REFERENCE

The disclosure of Japanese Patent Application No. 2018-194049 filed on Oct. 15, 2018 including the specification, drawings and abstract is incorporated herein by reference in its entirety.

BACKGROUND

1. Technical Field

The present disclosure relates to a label reading system. In particular, the present disclosure relates to a system for reading a label attached to each of a plurality of loads being transferred by a transfer vehicle.

2. Description of Related Art

Conventionally, loads (e.g., parts boxes containing parts) delivered to a factory (e.g., an automobile production factory) each bear a label in which information on the parts contained in the load, such as the type and the number of pieces, is written. For example, a barcode or a QR code (R) is depicted in this label. When the load is delivered, this barcode or QR code is read with a scanner etc. to acquire the information, and whether or not the parts have been appropriately delivered is inspected. Thus, missing of parts and other errors can be prevented.

Japanese Patent Application Publication No. 2006-27773 discloses a system in which an IC tag in which information, such as the type and the number of pieces of parts, is written is attached to each of a plurality of loads placed on a pallet (hereinafter this form of placement of loads will be referred to as a skid), and the skid is passed through a gate of a tag reader while being transferred by a transfer vehicle, such as a truck or a forklift, and thereby the information of the IC tag of each load is acquired by the tag reader.

SUMMARY

When the labels of the respective loads are read while the skid is transferred as described above, there is no guarantee that the labels of all the loads can be appropriately read to acquire the information. Moreover, it is unlikely that the same number of loads are always transferred at a time by the transfer vehicle. Therefore, when the labels of the loads have been read, whether or not the number of pieces of information (the number of loads on which information has been appropriately acquired by reading the label) matches the number of all the loads being transferred, cannot be appropriately determined. For example, when the number of loads on which information has been appropriately acquired is 48, one cannot determine whether the number of loads being actually transferred is 48, or, say, 50 loads are being transferred and information on two loads among these loads has not been appropriately acquired. In addition, when there is a load on which information has not been appropriately acquired, one cannot identify which one of loads in the stack of loads (the stack of loads on the skid) is that load, either.

The present disclosure has been contrived in view of these circumstances, and an object thereof is to provide a label reading system that can identify the number and the positions of loads on which information has not been appropriately acquired.

Solutions adopted by the present disclosure to achieve the above object assume a label reading system in which labels respectively attached to those surfaces of a plurality of loads placed on a transfer vehicle that extend in a direction along a traveling direction of the transfer vehicle are read as the transfer vehicle passes through a label reading area. This label reading system includes: a group of label imaging devices that is installed in the label reading area, that includes a plurality of label imaging devices each capable of imaging some of the labels attached to the respective loads, and that is configured to be able to image all the labels of the loads when the loads have passed through the label reading area; and a label information integrating and displaying device that, based on information on a plurality of images taken by the label imaging devices of the group of label imaging devices, assigns either information that label information has been appropriately acquired or information that label information has not been appropriately acquired to each of the loads placed on the transfer vehicle, and then displays the information assigned to each of the loads over a corresponding load in an image showing the loads.

"All the labels of the loads" here means the labels respectively attached to a plurality of loads located on a side imaged by the label imaging devices of the group of imaging devices (e.g., the side of one side surface of the skid).

According to the above specifications, when the transfer vehicle having a plurality of loads placed thereon passes through the label reading area, the labels attached to the respective loads are imaged by the label imaging devices of the group of label imaging devices. When the loads have passed through the label reading area, all the labels of these loads have been imaged. In this case, there may be loads of which the label information has been appropriately acquired and loads of which the label information has not been appropriately acquired. Based on information on a plurality of images taken by the label imaging devices, the label information integrating and displaying device assigns either information that the label information has been appropriately acquired or information that the label information has not been appropriately acquired to each of the loads, and then displays the information assigned to each load over a corresponding load in an image showing the loads. By visually checking the image showing the loads, a worker can easily recognize a load of which the label information has not been appropriately acquired.

The above label reading system may further include a stack-of-loads imaging device that images a plurality of loads placed on the transfer vehicle as one image, and the label information integrating and displaying device may be configured to display information on each of the loads to which either the information that the label information has been appropriately acquired or the information that the label information has not been appropriately acquired is assigned, over a corresponding load in an image showing the loads taken by the stack-of-loads imaging device.

This label reading system can easily acquire an image showing a plurality of loads by the stack-of-loads imaging device while being able to read each label with high precision by each of the label imaging devices. Thus, the means for reading each label and acquiring the information of the label and the means for acquiring an image showing a plurality of loads are separately provided (the functions are divided between the means), which can enhance the usefulness of the label reading system.

The label information integrating and displaying device may be configured to display either the information that the label information has been appropriately acquired or the information that the label information has not been appropriately acquired over an image showing the loads, by performing a coordinate point conversion process that involves arranging images of the loads taken by the label imaging devices of the group of label imaging devices in a coordinate system, and converting a coordinate point of an information presenting portion of the label of each of the loads into a coordinate point of the information presenting portion of the label of the load in an image showing the loads taken by the stack-of-loads imaging device.

Performing such a coordinate point conversion process can simplify the process of displaying either the information that the label information has been appropriately acquired or the information that the label information has not been appropriately acquired over an image showing the loads, which can also enhance the usefulness of the label reading system.

In this case, a plurality of loads may be placed on the transfer vehicle in a direction along the traveling direction of the transfer vehicle, and the label imaging device may sequentially image the labels attached to the respective loads as the transfer vehicle travels and the loads sequentially move into an imaging range of the label imaging device. In the coordinate point conversion process, a computational formula having a traveling speed of the transfer vehicle as one of parameters may be used to convert the coordinate point of the information presenting portion of the label of each of the loads imaged by the label imaging device into the coordinate point of the information presenting portion of the label of the load in an image showing the loads taken by the stack-of-loads imaging device.

This label reading system can read the labels attached to the respective loads placed in a direction along the traveling direction of the transfer vehicle by using a single label imaging device. Moreover, this system can convert the coordinate point of the information presenting portion of the label of each load by performing the coordinate point conversion process that uses the traveling speed of the transfer vehicle as one of parameters.

The label imaging devices of the group of label imaging devices may be disposed along a vertical direction, with each of the label imaging devices having a different imaging field of view in the vertical direction, and may be configured such that a label imaging device located at a lowest position images at least a label attached to a load in a bottom tier of a plurality of loads stacked in tiers while a label imaging device located at a highest position images at least a label attached to a load in a top tier of the loads stacked in tiers.

This label reading system can appropriately image all the labels of a plurality of loads stacked in tiers, including the label attached to a load in the bottom tier and the label attached to a load in the top tier, by using some of the label imaging devices.

The label information integrating and displaying device may be configured to create an image showing a plurality of loads by performing an image combining process of combining a plurality of images taken by the label imaging devices of the group of label imaging devices into an image in which the same labels are superimposed on each other such that the image does not contain duplicate labels, and then display information on each of the loads to which either the information that the label information has been appropriately acquired or the information that the label information has not been appropriately acquired is assigned, over a corresponding load in the created image.

This label reading system can eliminate the need for the above-described coordinate point conversion process, and can thereby simplify the process for creating an image that allows recognition of a load of which the label information has not been appropriately acquired (an image over which information on each load to which either the information that the label information has been appropriately acquired or the information that the label information has not been appropriately acquired is assigned is displayed).

In the present disclosure, based on information on a plurality of images taken by the label imaging devices of the group of label imaging devices, either information that the label information has been appropriately acquired or information that the label information has not been appropriately acquired is assigned to each of a plurality of loads placed on the transfer vehicle. Then, the information assigned to each load is displayed over a corresponding load in an image showing the loads. By visually checking the image showing the loads, a worker can easily recognize a load of which the label information has not been appropriately acquired.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein.

DETAILED DESCRIPTION OF EMBODIMENTS

Embodiments of the present disclosure will be described below based on the drawings. These embodiments will be described as to a case where the present disclosure is applied as a system for reading QR codes (R) in labels attached to a plurality of delivered loads (parts boxes containing parts) in an automobile production factory.

Figure 3:
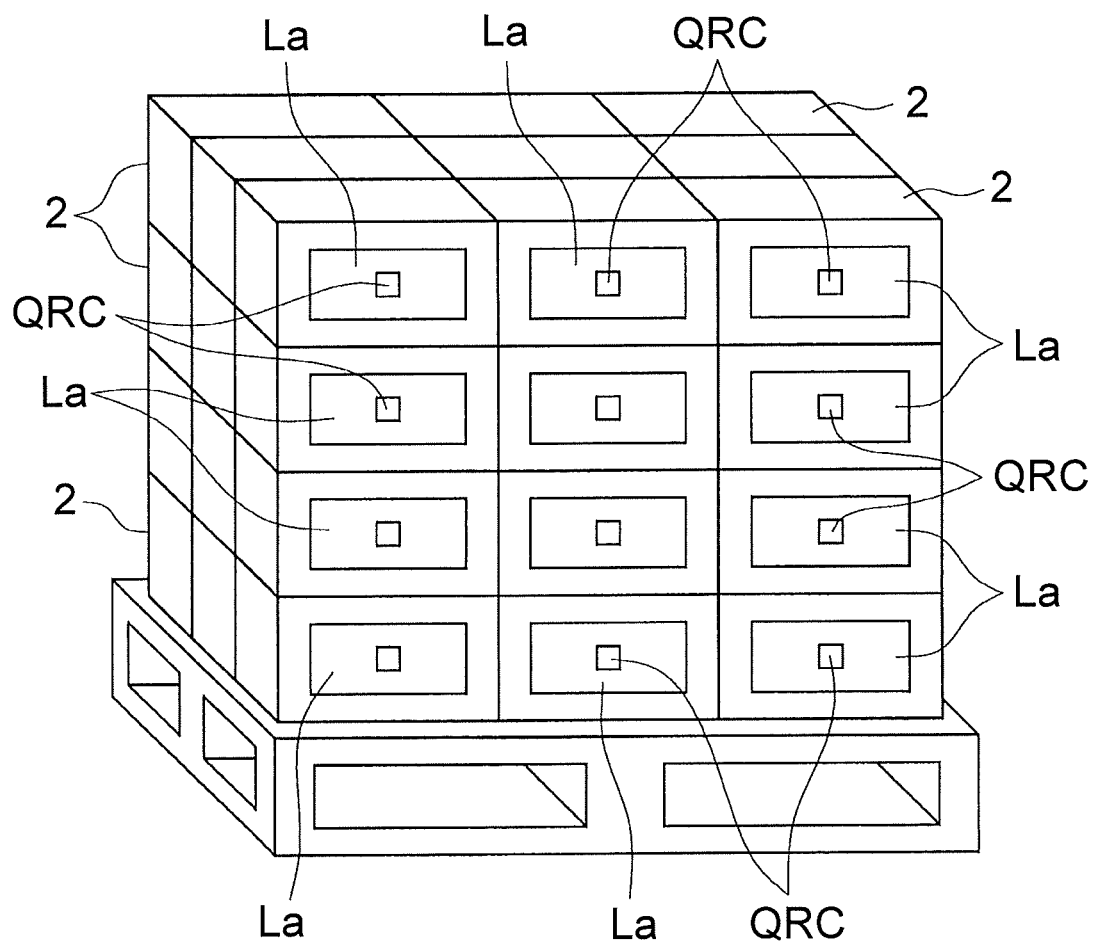
FIG. 3 is a view showing an example of the form of placement of a plurality of parts boxes on a pallet.

More specifically, parts are delivered to the premises of the production factory by a truck from a supplier or a distribution depot. Parts are delivered in the form of a skid with a plurality of parts boxes containing these parts placed on a pallet (see FIG. 3). In the label reading system according to the embodiments, QR codes QRC, QRC, . . . in labels La, La, . . . ("the information presenting portion of the label" as termed in the present disclosure) attached to side surfaces of the respective parts boxes 2, 2, . . . are read while a skid Sk is transferred by a forklift 10 (see FIG. 1), to thereby acquire information on the parts contained in each of the parts boxes 2, 2, . . . , such as the type and the number of pieces, and inspect whether or not the parts have been appropriately delivered. The skid Sk having undergone the inspection is transferred by the forklift (transfer device) 10 toward a skid chute etc. installed inside the production factory.

In the following, each embodiment will be described.

First Embodiment

First, a first embodiment will be described. A label reading system 1 according to this embodiment is a system in which the QR codes QRC, QRC, . . . in the labels La, La, . . . respectively attached to a plurality of parts boxes (loads) 2, 2, . . . being transferred by the forklift 10 are read as the parts boxes (loads) 2, 2, . . . pass through a label reading area A. The labels La, La, . . . showing the QR codes QRC, QRC, . . . are respectively attached to those surfaces (side surfaces) of the parts boxes 2, 2, . . . that extend in a direction along a traveling direction of the forklift 10.

Configuration of Label Reading System

Figure 1:
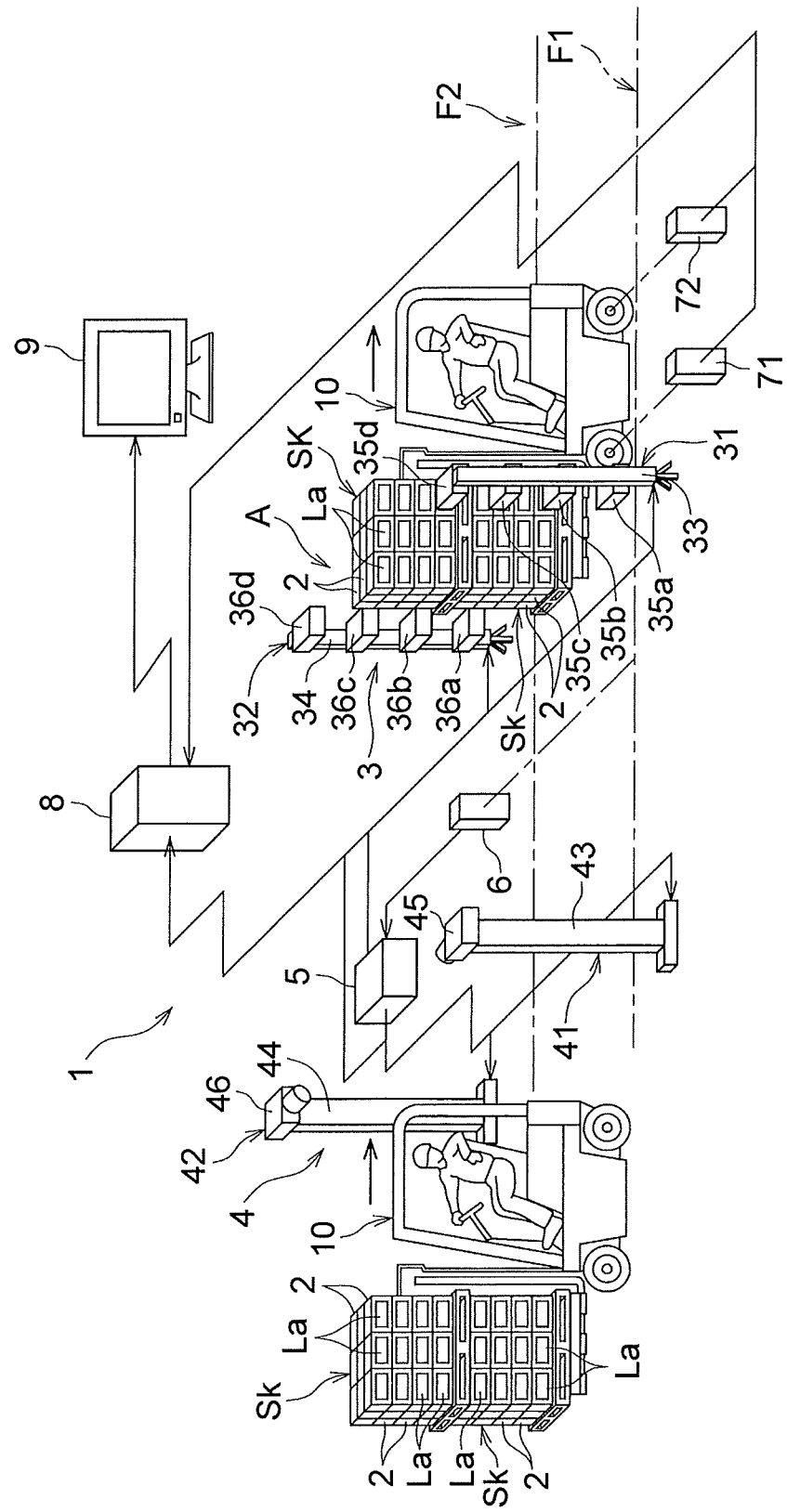
FIG. 1 is a view showing a schematic configuration of a label reading system according to a first embodiment.

FIG. 1 is a view showing a schematic configuration of the label reading system 1 according to this embodiment. As shown in FIG. 1, the label reading system 1 includes a QR-code imaging device 3 installed in the label reading area A, a stack-of-loads imaging device 4, a imaging control device 5, a passage sensor 6, a first distance sensor 71, a second distance sensor 72, an information processing terminal 8, a monitor device 9, etc.

The QR-code imaging device 3 includes a pair of QR-code imaging units 31, 32 installed at a predetermined interval in the label reading area A. A space between the QR-code imaging units 31, 32 is a passage space for the forklift 10, and a floor surface including a floor surface in this passage space and extending in a right-left direction in FIG. 1 forms a travel path F1 (the path between the long dashed-short dashed lines in FIG. 1) on which the forklift 10 travels. Accordingly, the dimension of interval between the pair of QR-code imaging units 31, 32 is set to be larger than the width dimensions of the forklift 10 and the skid Sk (the dimensions in a horizontal direction orthogonal to an extension direction of the travel path F1). Here, as seen in a direction toward a downstream side in the traveling direction of the forklift 10 (the right side in FIG. 1), the QR-code imaging unit located on the right side (the near side in FIG. 1) will be referred to as a first QR-code imaging unit 31, and the QR-code imaging unit located on the left side (the far side in FIG. 1) will be referred to as a second QR-code imaging unit 32.

The QR-code imaging units 31, 32 include pillars 33, 34 each erected on a floor surface (the floor surface on each side of the travel path F1) F2, and cameras 35a to 35d, 36a to 36d disposed at equal intervals on the pillars 33, 34, at a plurality of positions (four positions in this embodiment) in a vertical direction. The cameras 35a to 35d, 36a to 36d are disposed so as to image an inside of the travel path F1, and each image a predetermined range in the vertical direction. Information on images taken by the cameras 35a to 35d, 36a to 36d are sent to the information processing terminal 8. Specifically, for each of the QR codes QRC, QRC, . . . in the labels La, La, . . . , information about whether or not the QR code QRC has been appropriately read by the cameras 35a to 35d, 36a to 36d is sent to the information processing terminal 8. The number of the cameras 35a to 35d, 36a to 36d is not limited to that mentioned above.

The number of the cameras 35a to 35d, 36a to 36d is set according to the height dimension of the skids Sk, Sk that pass through the label reading area A, such that these cameras can image the labels La, La, . . . of all the parts boxes (all the parts boxes in a height direction) 2, 2, . . . on the skids Sk, Sk. For example, in this embodiment, the skids Sk, Sk placed in a two-tier stack pass through the label reading area A as shown in FIG. 1. Accordingly, such a number of the cameras 35a to 35d, 36a to 36d that can image the labels La, La, . . . of all the parts boxes (all the parts boxes in the height direction) 2, 2, . . . on the skids Sk, Sk are provided. Thus, each of the cameras 35a to 35d, 36a to 36d constitutes the "label imaging device" (the label imaging device capable of imaging some of the labels attached to the respective loads) as termed in the present disclosure. Each of the QR-code imaging units 31, 32 constitutes the "group of label imaging devices" (the group of label imaging devices configured to be able to image all the labels of the loads when the loads have passed through the label reading area) as termed in the present disclosure.

Figure 2:
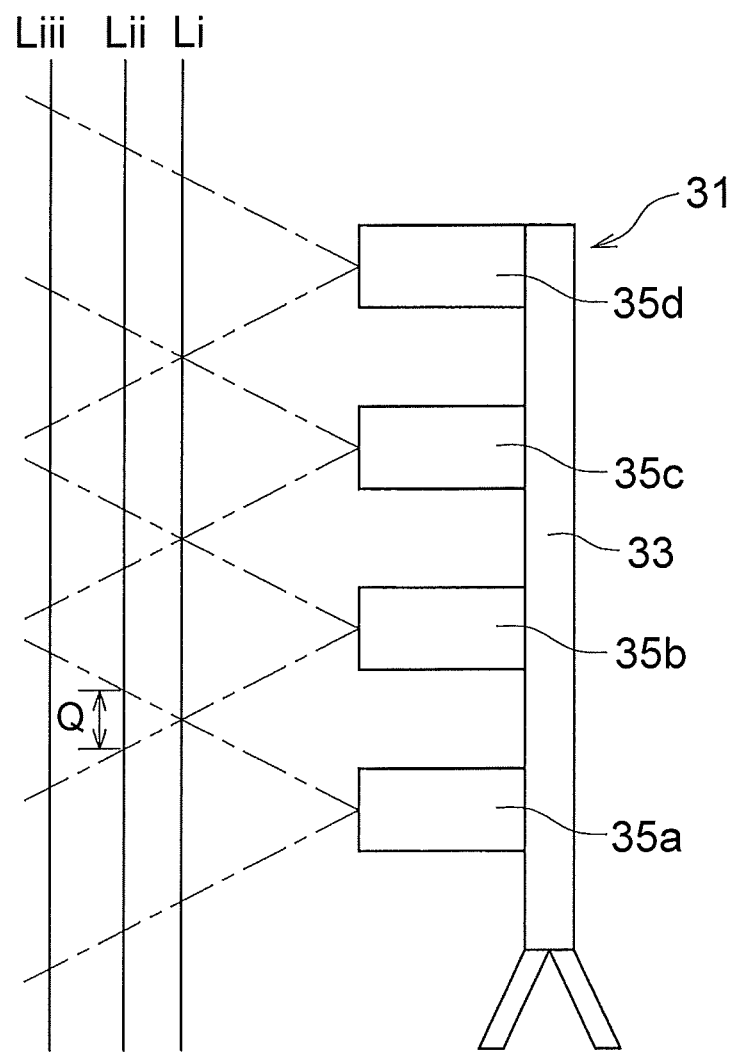
FIG. 2 is a view illustrating an imaging range, in a vertical direction, of each camera of a QR-code imaging unit on one side.

FIG. 2 is a view illustrating an imaging range, in the vertical direction, of each of the cameras 35a to 35d of the QR-code imaging unit 31 on one side (the first QR-code imaging unit). As shown in FIG. 2, the cameras 35a to 35d each have a predetermined angular field of view in the vertical direction. Specifically, as the distance from the cameras 35a to 35d increases, the imaging ranges (see the ranges indicated by the long dashed-short dashed lines in FIG. 2) increase. While the imaging ranges of the cameras 35a to 35d do not overlap one another on the right side from the position Li in FIG. 2 (the side closer to the cameras 35a to 35d), the imaging ranges of the cameras 35a to 35d overlap one another on the left side from the position Li (the side farther away from the cameras 35a to 35d). At the position Lii in FIG. 2, the height of overlap (the area of overlap) of the imaging ranges of the cameras 35a to 35d roughly matches a height dimension Q of the QR code QRC. This means that if the label La (the QR code QRC in the label La) passes on the left side from the position Lii, a single camera 35a (35b, 35c, 35d) can image the entire one QR code QRC (the entire QR code QRC in the height direction). The position Liii in FIG. 2 is a limit position beyond which the cameras 35a to 35d cannot focus. (The cameras 35a to 35d cannot focus on the left side from the position Liii.) The QR-code imaging unit 32 on the other side (second QR-code imaging unit) has a similar configuration.

In this embodiment, of the cameras 35a to 35d, 36a to 36d, the cameras disposed at lowest positions will be referred to as first cameras 35a, 36a; the cameras disposed at the second positions from below will be referred to as second cameras 35b, 36b; the cameras disposed at the third positions from below will be referred to as third cameras 35c, 36c; and the cameras disposed at the highest positions will be referred to as fourth cameras 35d, 36d.

The stack-of-loads imaging device 4 is disposed on an upstream side of the installation position of the QR-code imaging device 3 in the extension direction of the travel path F1 (an upstream side in the traveling direction of the forklift 10 (the left side in FIG. 1)). The stack-of-loads imaging device 4 includes a pair of stack-of-loads imaging units (stack-of-loads imaging devices) 41, 42 installed one on each side of the travel path F1 (each side in the horizontal direction orthogonal to the extension direction of the travel path F1). The dimension of interval between the stack-of-loads imaging units 41, 42 is also set to be larger than the width dimensions of the forklift 10 and the skid Sk (the dimensions in the horizontal direction orthogonal to the extension direction of the travel path F1). To be able to image the entire stack of loads on the skids Sk, Sk (to be able to image all the parts boxes 2, 2, . . . as one image), the stack-of-loads imaging units 41, 42 are installed at positions a predetermined distance away from the travel path F1 such that the entire stack of loads (all the parts boxes 2, 2, . . . ) on the skids Sk, Sk is contained inside imaging fields of view of cameras 45, 46, to be described later. For example, in this embodiment, the skids Sk, Sk placed in a two-tier stack are transferred as shown in FIG. 1. Therefore, the stack-of-loads imaging units 41, 42 are installed at positions a predetermined distance away from the travel path F1 such that all the parts boxes 2, 2, . . . (the entire stack of loads) on the skids Sk, Sk are contained inside the imaging fields of view of the cameras 45, 46. Here, as seen in the direction toward the downstream side in the traveling direction of the forklift 10 (the right side in FIG. 1), the stack-of-loads imaging unit located on the right side (the near side in FIG. 1) will be referred to as a first stack-of-loads imaging unit 41, and the stack-of-loads imaging unit located on the left side (the far side in FIG. 1) will be referred to as a second stack-of-loads imaging unit 42.

The stack-of-loads imaging units 41, 42 include pillars 43, 44 each erected on the floor surface (the floor surface on each side of the travel path F1) F2, and the cameras 45, 46 disposed at upper ends of the pillars 43, 44. The cameras 45, 46 are disposed so as to image the inside of the travel path F1, and each image the entire stack of loads on the skids Sk, Sk as described above. Specifically, the camera 45 of the first stack-of-loads imaging unit 41 images the entire stack of loads on the near side in FIG. 1 (the entire side surface of the stack of loads on the near side; all the labels La, La, . . . on the side surface on the near side). The camera 46 of the second stack-of-loads imaging unit 42 images the entire stack of loads on the far side in FIG. 1 (the entire side surface of the stack of loads on the far side; the labels La, La, . . . on the side surface on the far side).

While the cameras 45, 46 of the stack-of-loads imaging units 41, 42 image the entire stack-of-loads, these cameras 45, 46 cannot read the QR codes QRC, QRC, . . . in the respective labels La, La, . . . (cannot acquire the information of the QR codes QRC, QRC, . . . ) and function merely as means for acquiring images of the entire stack of loads.

Information on images taken by the cameras 45, 46 is sent to the information processing terminal 8.

The imaging control device 5 is connected to the passage sensor 6, and sends an activation command signal to each of the imaging units 31, 32, 41, 42 in accordance with an output from the passage sensor 6. The imaging control device 5 generally includes a commonly known central processing unit (CPU), a read-only memory (ROM), a random-access memory (RAM), etc. (none of which is shown). The ROM stores a control program etc. used to control imaging actions of the imaging units 31, 32, 41, 42. The CPU executes a computation process based on the control program stored in the ROM. The RAM is a memory that temporarily stores a computation result of the CPU etc.

The passage sensor 6 is disposed between the installation position of the QR-code imaging device 3 and the installation position of the stack-of-loads imaging device 4 (on the upstream side of the installation position of the QR-code imaging device 3 but on the downstream side of the installation position of the stack-of-loads imaging device 4) in the extension direction of the travel path F1, and detects passage of the forklift 10 on the travel path F1. The passage sensor 6 optically detects passage of the forklift 10. Equipped with a light projector-receiver facing the travel path F1, the passage sensor 6 detects passage of the forklift 10 by detecting the presence or absence of light reflecting off a reflector provided on the forklift 10. Upon detecting passage of the forklift 10, the passage sensor 6 sends a passage detection signal to the imaging control device 5.

The first distance sensor 71 is disposed a predetermined distance away from and on the downstream side of the installation position of the QR-code imaging device 3 (on the downstream side in the traveling direction of the forklift 10 on the travel path F1), and detects passage of the forklift 10 on the travel path F1. The first distance sensor 71 also optically detects passage of the forklift 10. Equipped with a light projector-receiver facing the travel path F1, the first distance sensor 71 detects passage of the forklift 10 by detecting the presence or absence of light reflecting off the reflector provided on the forklift 10. Upon detecting passage of the forklift 10, the first distance sensor 71 sends a passage detection signal to the information processing terminal 8.

The second distance sensor 72 is disposed a predetermined distance away from and on the downstream side of the installation position of the QR-code imaging device 3 (on the downstream side in the traveling direction of the forklift 10 on the travel path F1), and a predetermined distance away from and on the downstream side of the installation position of the first distance sensor 71 (on the downstream side in the traveling direction of the forklift 10 on the travel path F1). The second distance sensor 72 detects passage of the forklift 10 on the travel path F1 after the forklift 10 passes through the installation position of the first distance sensor 71. The second distance sensor 72 also optically detects passage of the forklift 10, and has a configuration similar to that of the first distance sensor 71. Upon detecting passage of the forklift 10, the second distance sensor 72 also sends a passage detection signal to the information processing terminal 8.

The distance sensors 71, 72 can also measure the distance from the distance sensors 71, 72 to the label La (hereinafter also referred to as an imaging distance). Specifically, the distance sensors 71, 72 measure the distance to a reflecting object (e.g., the label La) based on a time from when the light projector-receiver projects light until when the light projector-receiver receives reflected light. Thus, the traveling position (a depth to be described later) of the forklift 10 in the horizontal direction orthogonal to the extension direction of the travel path F1 can be detected.

The information processing terminal 8 includes a commonly known CPU, an ROM, an RAM, etc., and receives information on images (information on images of the QR codes QRC) sent from the cameras 35a to 35d, 36a to 36d of the QR-code imaging device 3, information on images (information on images of the entire stack of loads) sent from the cameras 45, 46 of the stack-of-loads imaging device 4, and output signals (passage detection signals etc.) from the distance sensors 71, 72.

Based on the information on images received from the cameras 35a to 35d, 36a to 36d of the QR-code imaging device 3, the information processing terminal 8 acquires information of the QR codes QRC, QRC, . . . . Then, based on the information of the QR codes QRC, QRC, . . . , the information processing terminal 8 acquires information on the parts contained in each of the parts boxes 2, 2, . . . , such as the type and the number of pieces. Specifically, parts order information is stored in the information processing terminal 8 in advance, and for the parts in those parts boxes 2 of which the QR codes QRC have been appropriately read, the information processing terminal 8 determines whether or not the parts boxes 2 have been appropriately delivered by cross-checking the information on the parts boxes 2 acquired from the QR codes QRC against this order information.

The information processing terminal 8 executes an unreadable label identification process to be described later (a process featured in this embodiment) by using the acquired information, and creates an image (unreadable label identifying image) that allows identification of the number of labels of which the QR codes QRC have not been appropriately read (unreadable labels) and the positions of these unreadable labels (the positions in the stack of loads), and then sends the created image to the monitor device 9. For this purpose, the ROM of the information processing terminal 8 stores a control program etc. for executing the unreadable label identification process to be described later, and the CPU executes the unreadable label identification process based on the control program stored in the ROM.

The monitor device 9 receives an output from the information processing terminal 8 and displays the result on a screen. Specifically, the monitor device 9 receives information on the image (unreadable label identifying image) created by the unreadable label identification process from the information processing terminal 8, and displays this image. The display on the monitor device 9 is checked by a worker (manager).

Unreadable Label Identification Process

Next, the unreadable label identification process featured in this embodiment will be described.

In a system in which information on each of the parts boxes 2, 2, . . . (information of the QR codes QRC) is acquired while the skid Sk is transferred, there is no guarantee that the labels La, La, . . . of all the parts boxes 2, 2, . . . can be appropriately read to acquire the information. Moreover, it is unlikely that the same number of parts boxes 2, 2, . . . are always transferred at a time by the forklift 10. Therefore, in the related art, when the labels of the respective parts boxes have been read, whether or not the number of pieces of information (the number of parts boxes on which information has been appropriately acquired by reading the label) matches the number of all the parts boxes being transferred cannot be appropriately determined. For example, when the number of parts boxes on which information has been appropriately acquired is 48, one cannot determine whether the number of the parts boxes being actually transferred is 48, or, say, 50 parts boxes are being transferred and information on two parts boxes among these parts boxes has not been acquired. In addition, when there is a parts box on which information has not been appropriately acquired, one cannot identify which one of the parts boxes in the stack of loads is that parts box, either.

Having been contrived in view of these circumstances, the unreadable label identification process according to this embodiment can identify the number and the positions of the parts boxes 2 on which information has not been appropriately acquired. Specifically, the unreadable label identification process can identify the number and the positions of those parts boxes 2 in the stack of loads on the skids Sk, Sk on which information (the information of the QR codes QRC) has not been appropriately acquired, based on information on images (information on images of the QR codes QRC) sent from the cameras 35a to 35d, 36a to 36d of the QR-code imaging device 3, information on images (information on images of the entire stack of loads) sent from the cameras 45, 46 of the stack-of-loads imaging device 4, and output signals (passage detection signals) from the distance sensors 71, 72.

An overview of the unreadable label identification process is as follows: A coordinate point conversion process is performed in which a center position of the QR code QRC in each of images sent from the cameras 35a to 35d, 36a to 36d of the QR-code imaging device 3 is defined as a coordinate point in that image (this coordinate point will be hereinafter referred to as a QR-code coordinate point), and then the QR-code coordinate point is converted into a corresponding coordinate point (a coordinate point in the same QR code QRC) in an image (an image of the entire stack of loads) sent from the cameras 45, 46 of the stack-of-loads imaging device 4 (this coordinate point is the center position of the QR code QRC, and will be hereinafter referred to as a stack-of-loads coordinate point). This coordinate point conversion process is described in the present disclosure as the process "that involves arranging images of the loads taken by the label imaging devices in a coordinate system, and converting a coordinate point of an information presenting portion of the label of each of the loads into a coordinate point of the information presenting portion of the label of the load in an image showing the loads taken by the stack-of-loads imaging device."

For each QR-code coordinate point, it has been determined whether or not the QR code QRC located at that QR-code coordinate point has been appropriately read. Therefore, by converting each QR-code coordinate point into a stack-of-loads coordinate point, it is possible to identify, in the image of the entire stack of loads, the coordinate points of those QR codes QRC that have been appropriately read and the coordinate points of those QR codes QRC that have not been appropriately read, and then to display the information on the coordinate points of the QR codes QRC that have been appropriately read (circles in this embodiment) over the image of the entire stack of loads. In other words, in the image of the entire stack of loads (unreadable label identifying image), the coordinate points (stack-of-loads coordinate points) of those QR codes QRC that have been appropriately read and the coordinate points (stack-of-loads coordinate points) of those QR codes QRC that have not been appropriately read, can be displayed in different forms of display. This action corresponds to the action described in the present disclosure as follows: "based on information on a plurality of images taken by the label imaging devices, assigns either information that label information has been appropriately acquired or information that the label information has not been appropriately acquired to each of the loads placed on the transfer vehicle, and then displays the information assigned to each of the loads over a corresponding load in an image showing the loads," and corresponds to the action of the "label information integrating and displaying device" as termed in the present disclosure.

By involving such image processing, the unreadable label identification process allows a worker to learn the number and the positions of those parts boxes 2 of which the QR codes QRC have not been appropriately read (the information of the QR codes QRC has not been appropriately acquired) by visually checking the image of the entire stack of loads (unreadable label identifying image).

Next, the procedure of the process of converting a QR-code coordinate point into a stack-of-loads coordinate point will be specifically described. Here, the procedure of the process of converting a QR-code coordinate point on a surface (a side surface of the stack of loads) located on the near side in FIG. 1 into a stack-of-loads coordinate point will be described. The procedure of the process of converting a QR-code coordinate point on a surface (a side surface of the stack of loads) located on the far side in FIG. 1 into a stack-of-loads coordinate point is performed in the same manner.

Figure 4:
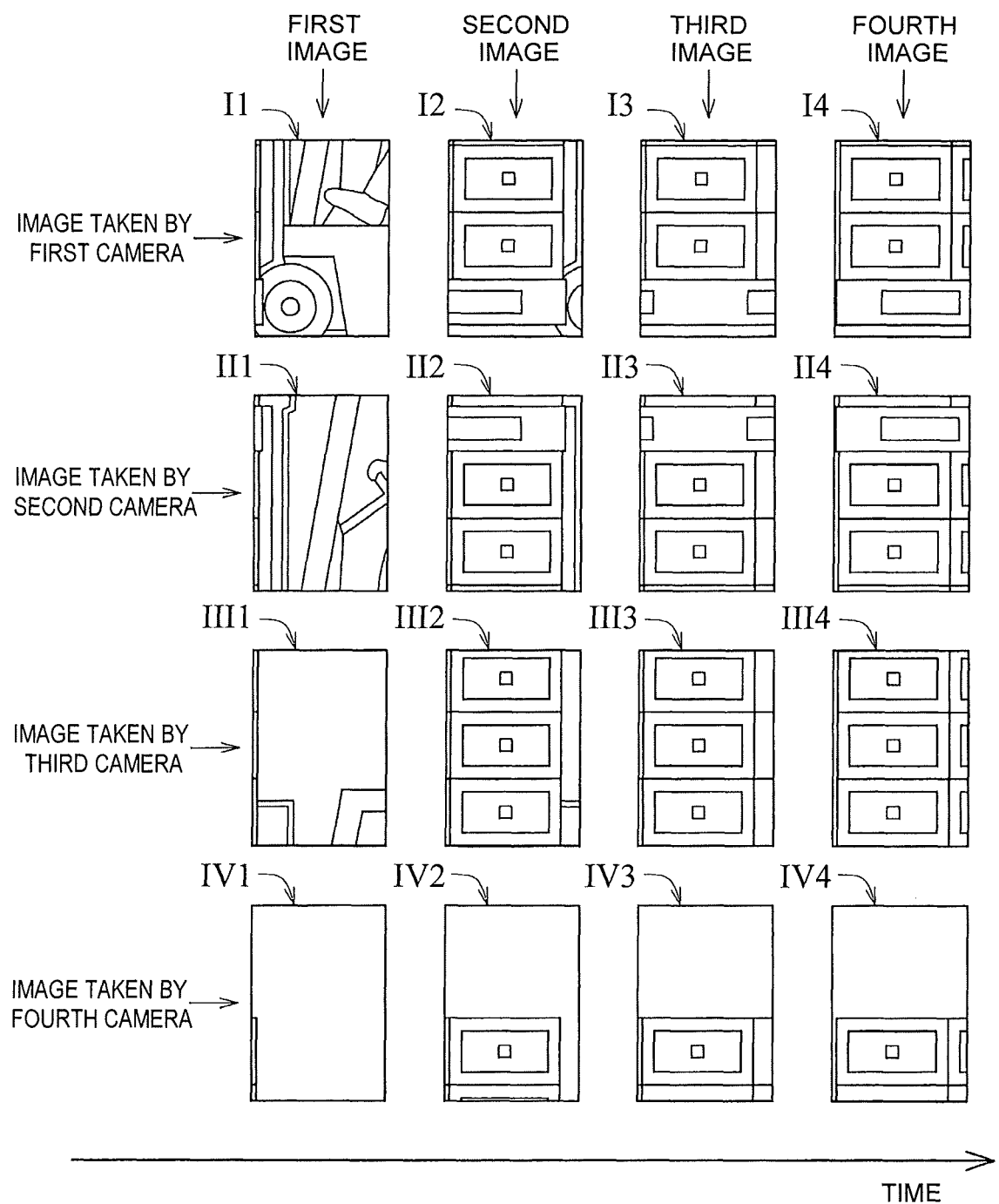
FIG. 4 is a view showing, in order of imaging, images taken by the cameras of the QR-code imaging unit.

FIG. 4 is a view showing, in order of imaging, images taken by the cameras 35*a* to 35*d* of the first QR-code imaging unit 31 (images sent from the cameras 35*a* to 35*d* to the information processing terminal 8). In the top row in FIG. 4, images taken by the first camera (the camera disposed at the lowest position) 35*a* are arranged in order of imaging (from left to right). In the second row, images taken by the second camera (the camera disposed at the second position from below) 35*b* are arranged in order of imaging. In the third row, images taken by the third camera (the camera disposed at the third position from below) 35*c* are arranged in order of imaging. In the bottom row, images taken by the fourth camera (the camera disposed at the highest position) 35*d* are arranged in order of imaging. The description here is based on the assumption that each of the cameras 35*a* to 35*d* images four times to thereby image the QR codes QRC, QRC, . . . in the labels La, La, . . . over the entire skids Sk, Sk.

Here, of the images taken by the first camera 35*a*, the first image (the image obtained by the first imaging) will be referred to as a first camera's first image (the image denoted by reference sign I1 in FIG. 4); the second image (the image obtained by the second imaging) will be referred to as a first camera's second image (the image denoted by reference sign I2 in FIG. 4); and the third image (the image obtained by the third imaging) will be referred to as a first camera's third image (the image denoted by reference sign I3 in FIG. 4); and the fourth image (the image obtained by the fourth imaging) will be referred to as a first camera's fourth image (the image denoted by reference sign I4 in FIG. 4). Of the images taken by the second camera 35*b*, the first image will be referred to as a second camera's first image (the image denoted by reference sing II1 in FIG. 4); the second image will be referred to as a second camera's second image (the image denoted by reference sign II2 in FIG. 4); the third image will be referred to as a second camera's third image (the image denoted by reference sign II3 in FIG. 4); and the fourth image will be referred to as a second camera's fourth image (the image denoted by reference sign II4 in FIG. 4). The images taken by the third camera 35*c* and the fourth camera 35*d* will be referred to in the same manner. These images are denoted by reference signs III1 to IV4 in FIG. 4. Thus, in these reference signs, the Roman numeral represents the camera number and the Arabic numeral represents the imaging number (the number of the image in order of imaging).

Figure 5:
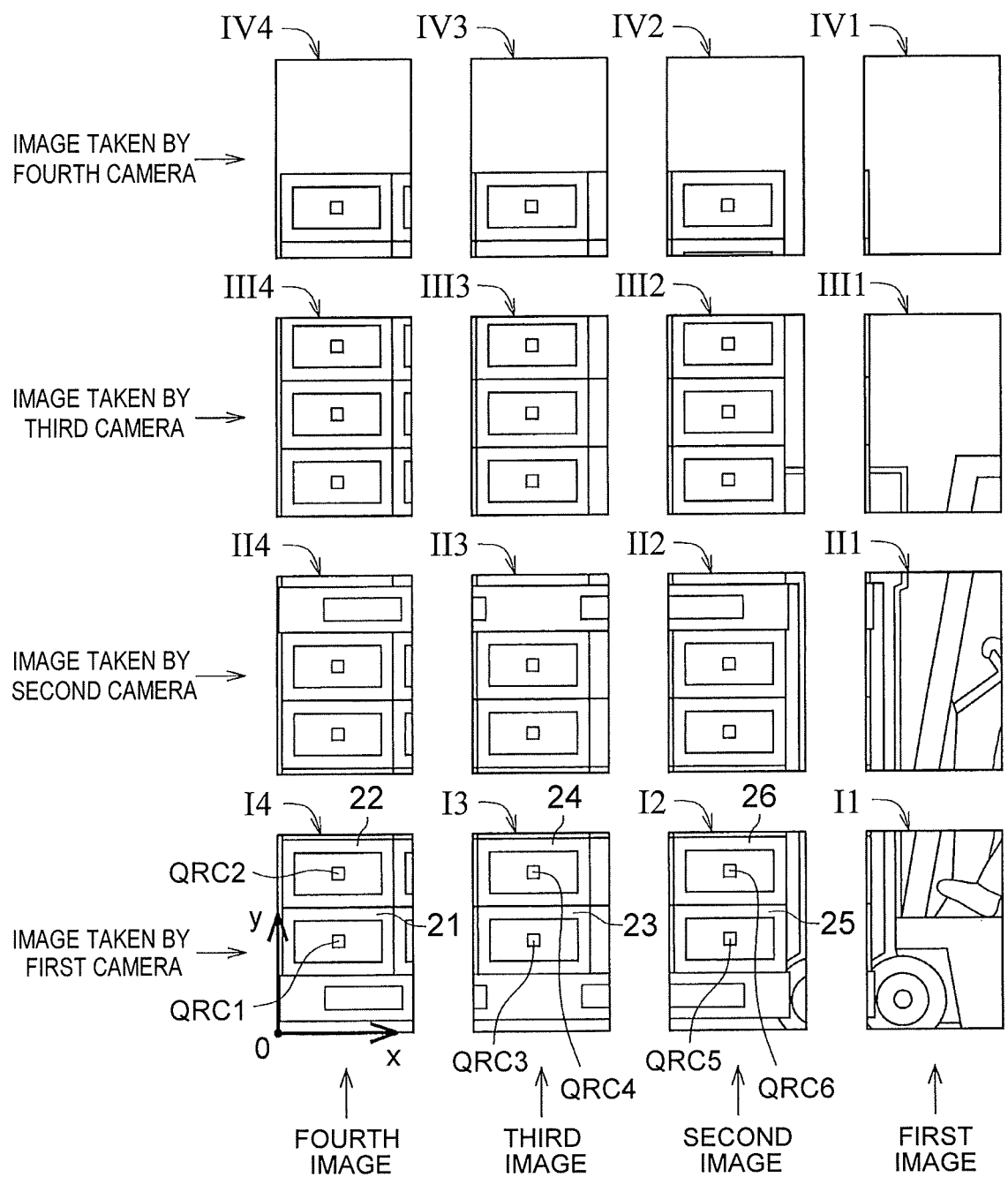
FIG. 5 is a view showing the images taken by the cameras of the QR-code imaging unit, as arranged in an x-y coordinate system.

FIG. 5 is a view showing the images taken by the cameras 35*a* to 35*d* of the first QR-code imaging unit 31 and sent from the cameras 35*a* to 35*d*, as arranged in an imaginary x-y coordinate system. In this x-y coordinate system, according to the actual form of the skids Sk, Sk, the images taken by the first camera 35*a* are arranged in the bottom row, from right to left in order of imaging; the images taken by the second camera 35*b* are arranged in the second row from below, from right to left in order of imaging; the images taken by the third camera 35*c* are arranged in the third row from below, from right to left in order of imaging; and the images taken by the fourth camera 35*d* are arranged in the top row, from right to left in order of imaging. Thus, in the bottom row, the first camera's first image I1, the first camera's second image I2, the first camera's third image I3, and the first camera's fourth image I4 are arranged in this order form right to left. In the second row from below, the second camera's first image II1, the second camera's second image II2, the second camera's third image II3, and the second camera's fourth image II4 are arranged in this order from right to left. The other images III1 to IV4 are arranged in the same manner.

In the x-y coordinate system, a lower left end of the last one of the images taken by the first camera 35*a* (first camera's fourth image I4) is taken as an origin o of the x-y coordinate system, and a coordinate point in the x-y coordinate system (the above-described QR-code coordinate point) is assigned to a center position of each QR code QRC.

For example, in the first camera's fourth image I4, QR codes QRC1, QRC2 of two parts boxes 2 (21, 22) placed one on top of the other are shown. The center position of the QR code QRC1 of the lower parts box (hereinafter referred to as a first parts box) 21 is assigned as a QR-code coordinate point (a1, b1) in the x-y coordinate system. The center position of the QR code QRC2 of the upper parts box (hereinafter referred to as a second parts box) 22 is assigned as a QR-code coordinate point (a1, b2) in the x-y coordinate system. In the first camera's third image I3, QR codes QRC3, QRC4 of two parts boxes 2 (23, 24) placed one on top of the other are shown. The center position of the QR code QRC3 of the lower parts box (hereinafter referred to as a third parts box) 23 is assigned as a QR-code coordinate point (a2, b1) in the x-y coordinate system. The center position of the QR code QRC4 of the upper parts box (hereinafter referred to as a fourth parts box) 24 is assigned as a QR-code coordinate point (a2, b2) in the x-y coordinate system. In the first camera's second image I2, QR codes QRC5, QRC6 of two parts boxes 2 (25, 26) placed one on top of the other are shown. The center position of the QR code QRC5 of the lower parts box (hereinafter referred to as a fifth parts box) 25 is assigned as a QR-code coordinate point (a3, b1) in the x-y coordinate system. The center position of the QR code QRC6 of the upper parts box (hereinafter referred to as a sixth parts box) 26 is assigned as a QR-code coordinate point (a3, b2) in the x-y coordinate system. In the other images, too, the center positions of the QR codes QRC are assigned as QR-code coordinate points (a1, b3) to (a3, b8) in the x-y coordinate system in the same manner. Thus, in these QR-code coordinate points, the suffix of a as the x-coordinate represents the number of the QR code in an x-axis direction (the number from a y-axis), and the suffix of b as the y-coordinate represents the number of the QR code in a y-axis direction (the number from an x-axis). Hereinafter, a general coordinate point of these QR-code coordinate points will be written as (an, bm). In this case, n is an integer and numbers 1 to 3 are assigned as n to the QR codes QRC from the left side toward the right side in FIG. 5, and m is also an integer and numbers 1 to 8 are assigned as m to the QR codes QRC from the lower side toward the upper side in FIG. 5.

Figure 6:
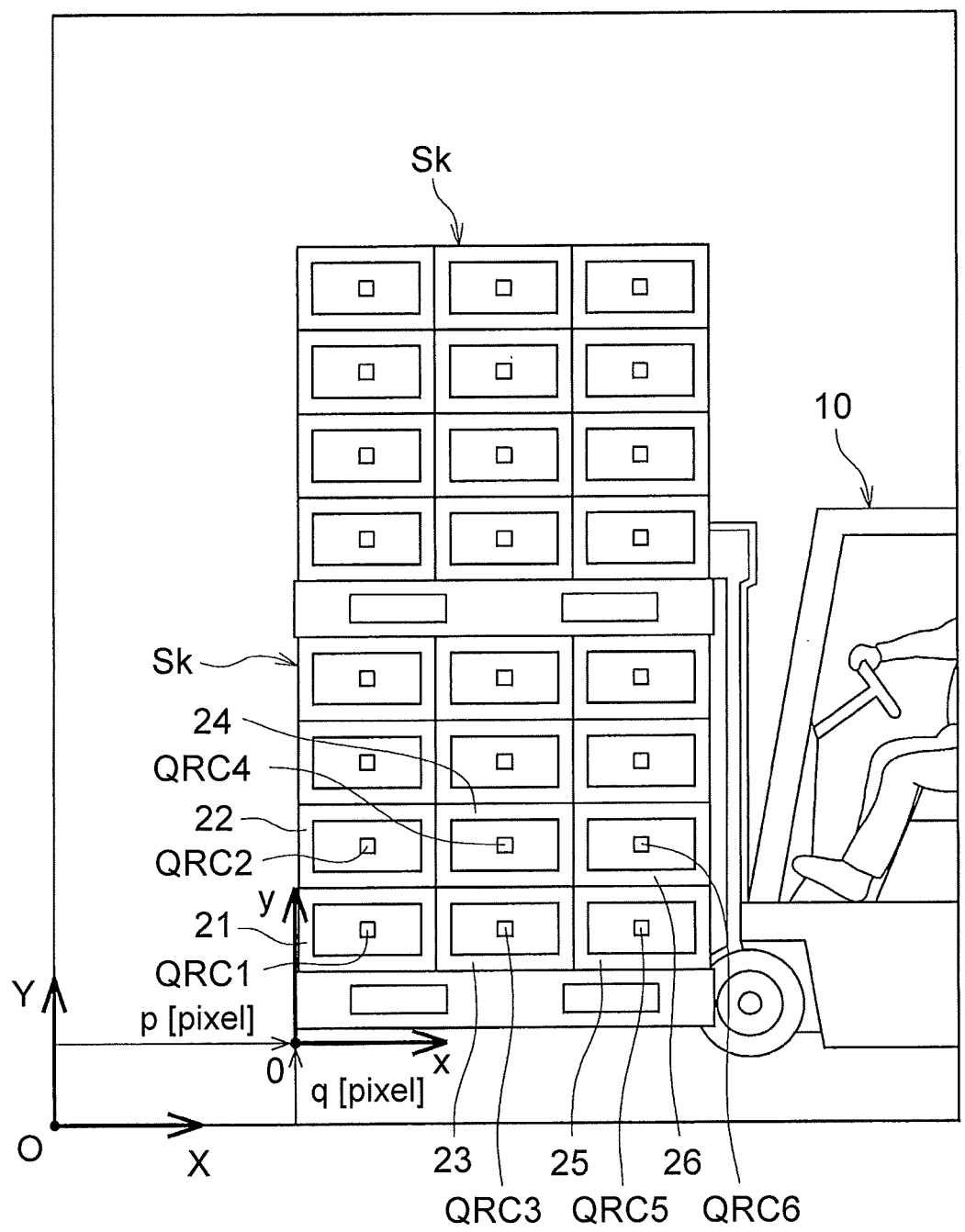
FIG. 6 is a view showing an image of an entire stack of loads imaged by a camera of a stack-of-loads imaging unit.

FIG. 6 is a view showing an image of the entire stack of loads taken by the camera 45 of the first stack-of-loads imaging unit 41 and sent from the camera 45. In FIG. 6, a lower left end of the image is taken as an origin O of an X-Y coordinate system, and coordinate points in this X-Y coordinate system (the above-described stack-of-loads coordinate points) are assigned to the center positions of the QR codes QRC. Here, to distinguish the X-Y coordinate system from the x-y coordinate system of FIG. 5, the coordinates are represented by capital X and Y and the origin is represented by capital O.

For example, the center position of the QR code QRC1 of the first parts box 21 is assigned as a stack-of-loads coordinate point (A1, B1) in the X-Y coordinate system. The center position of the QR code QRC2 of the second parts box 22 is assigned as a stack-of-loads coordinate point (A1, B2) in the X-Y coordinate system. The center position of the QR code QRC3 of the third parts box 23 is assigned as a stack-of-loads coordinate point (A2, B1) in the X-Y coordinate system. The center position of the QR code QRC4 of the fourth parts box 24 is assigned as a stack-of-loads coordinate point (A2, B2) in the X-Y coordinate system. The center position of the QR code QRC5 of the fifth parts box 25 is assigned as a stack-of-loads coordinate point (A3, B1) in the X-Y coordinate system. The center position of the QR code QRC6 of the sixth parts box 26 is assigned as a stack-of-loads coordinate point (A3, B2) in the X-Y coordinate system. The center positions of the QR codes QRC of the other parts boxes 2 are also assigned as stack-of-loads coordinate points (A1, B3) to (A3, B8) in the X-Y coordinate system in the same manner. Thus, in these stack-of-loads coordinate points, the suffix of A as the X-coordinate represents the number of the QR code in an X-axis direction (the number from a Y-axis), and the suffix of B as the Y-coordinate represents the number of the QR code in a Y-axis direction (the number from an X-axis). Hereinafter, a general coordinate point of these stack-of-loads coordinate points will be written as (An, Bm). In this case, n is an integer and numbers 1 to 3 are assigned as n to the QR codes QRC from the left side toward the right side in FIG. 6, and m is also an integer and numbers 1 to 8 are assigned as m to the QR codes QRC from the lower side toward the upper side in FIG. 6.

The process of converting a QR-code coordinate point (an, bm) that is the center position of the QR code QRC in the x-y coordinate system (FIG. 5) into a stack-of-loads coordinate point (An, Bm) that is the center position of the QR code QRC in the X-Y coordinate system (FIG. 6) is as follows: For example, the QR-code coordinate point (a1, b1) in the x-y coordinate system is converted into the stack-of-loads coordinate point (A1, B1) in the X-Y coordinate system. The QR-code coordinate point (a2, b1) in the x-y coordinate system is converted into the stack-of-loads coordinate point (A2, B1) in the X-Y coordinate system. Also for the other coordinate points, the QR-code coordinate point (an, bm) in the x-y coordinate system is converted into the stack-of-loads coordinate point (An, Bm) in the X-Y coordinate system. Thus, either information that the QR code QRC has been appropriately read or information that the QR code QRC has not been appropriately read, is associated with each of the QR-code coordinate point (an, bm) before conversion and the stack-of-loads coordinate point (An, Bm) after conversion.

To convert a QR-code coordinate point in the x-y coordinate system into a stack-of-loads coordinate point in the X-Y coordinate system, Formulae (1) and (2) below are used.

Formula (1) is a formula for converting a coordinate point in the x-axis direction (X-axis direction), and Formula (2) is a formula for converting a coordinate point in the y-axis direction (Y-axis direction). Formula (1) corresponds to "the computational formula having the traveling speed of the transfer vehicle as one of parameters" as termed in the present disclosure.

$$An = an \cdot k1 + p \cdot k2 + v \cdot t(Np) \cdot k2/S \tag{1}$$

$$Bm = bm \cdot k1 + q \cdot k2 + H(M-1) \cdot k2/S \tag{2}$$

Here, symbol An is the X-coordinate of the stack-of-loads coordinate point after conversion and the number of pixels from the origin O, and symbol an is the x-coordinate of the QR-code coordinate point before conversion and the number of pixels from the origin o. Symbol p is an origin offset amount (an origin offset amount for conversion of the coordinate point) in the X-axis direction in the X-Y coordinate system, and the unit is pixel. Symbol v is the speed (traveling speed) of the forklift 10 and the unit is mm/sec. Symbol t is an imaging interval (imaging time interval) and the unit is second. Symbol Np is a variable corresponding to the number of times of imaging, and becomes (Nmax−N) when the surface (the side surface of the stack of loads) located on the near side in FIG. 1 is the object (when the surface imaged by the camera 45 of the first stack-of-loads imaging unit 41 is the object). Symbol N is the number in order of imaging, and Nmax is the maximum value (four in this embodiment). Symbol N becomes (N−1) when the surface (the side surface of the stack of loads) located on the far side in FIG. 1 is the object (when the surface imaged by the camera 46 of the second stack-of-loads imaging unit 42 is the object). Symbol S is the length of one pixel at the depth of imaging (the actual length of an object appearing in one pixel, with the unit mm/pixel). Symbol Bm is the Y-coordinate of the stack-of-loads coordinate point after conversion and the number of pixels from the origin O. Symbol bm is the y-coordinate of the QR-code coordinate point before conversion and the number of pixels from the origin o. Symbol q is an origin offset amount in the Y-axis direction in the X-Y coordinate system (an origin offset amount for conversion of the coordinate point), and the unit is pixel. Symbol H is a mounting pitch of the cameras 35a to 35d and the unit is mm. Symbol M is a camera number. (The cameras 35a to 35d are numbered from bottom to top). Symbols k1 and k2 are conversion coefficients according to the position of passage of the forklift 10 (the position of passage in the horizontal direction orthogonal to the extension direction of the travel path F1; correlated with the distance between the label La and the cameras 35a to 35d), with k1 being a conversion coefficient relating to the x-y coordinate system (imaging by the first QR-code imaging unit 31) and k2 being a conversion coefficient relating to the X-Y coordinate system (imaging by the first stack-of-loads imaging unit 41).

Symbols p, q, t, Np, H, and M in Formulae (1) and (2) are preset or premeasured values, and are determined according to the specifications or control of the cameras 35a to 35d, 45, 46.

To obtain the stack-of-loads coordinate point (An, Bm) by the above Formulae (1) and (2), it is necessary to calculate the speed v of the forklift 10 and the conversion coefficients k1, k2. How to calculate these values will be described below.

Calculation of Speed of Forklift

The speed v of the forklift 10 is calculated as follows.

Figure 7:
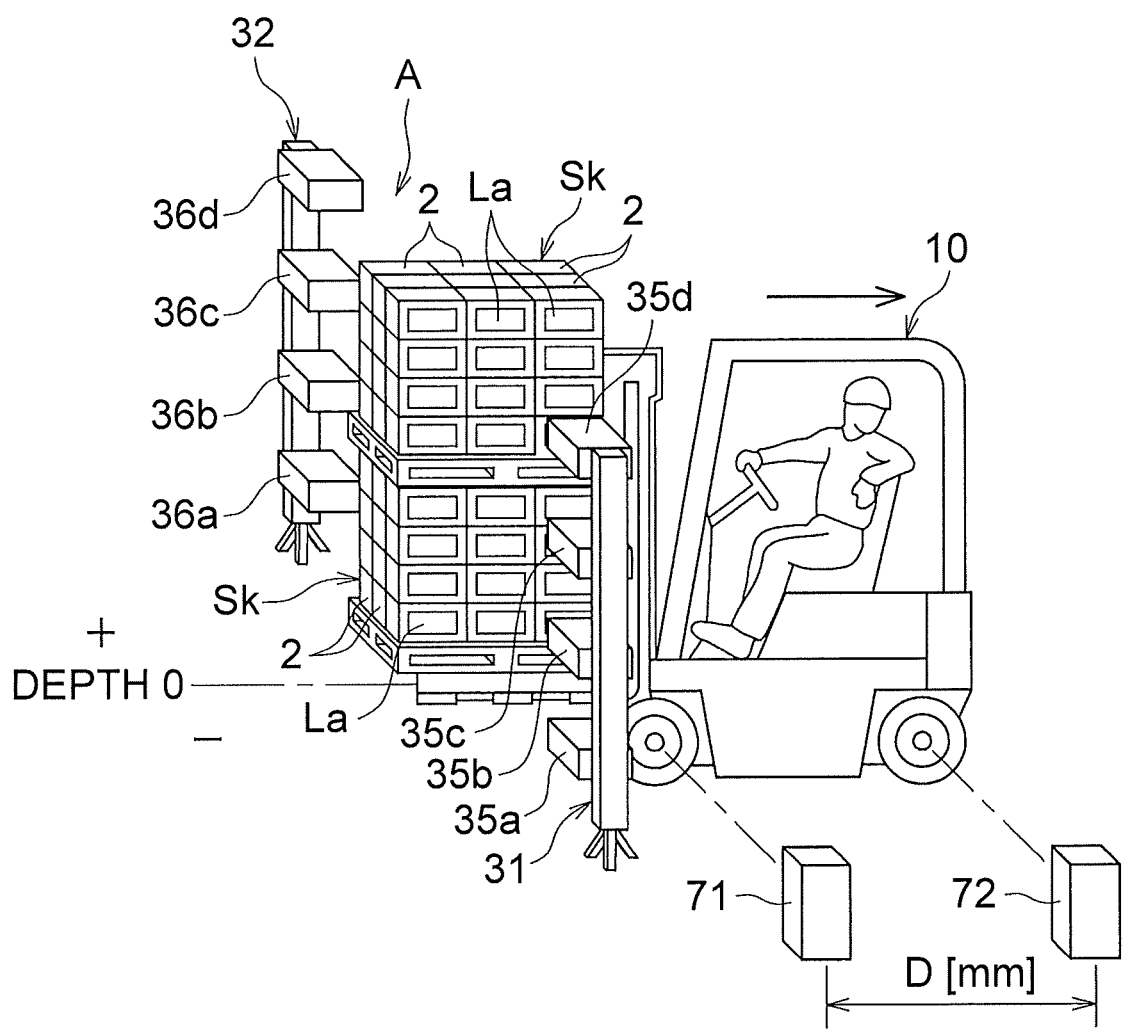
FIG. 7 is a view showing a state where a forklift is passing through a front side of distance sensors.

When the forklift 10 passes through the label reading area A as shown in FIG. 7, first, the forklift 10 passes through the front side of the first distance sensor 71 (reflects light from the first distance sensor 71), and after a predetermined time, passes through the front side of the second distance sensor 72 (reflects light from the second distance sensor 72).

Figure 8:
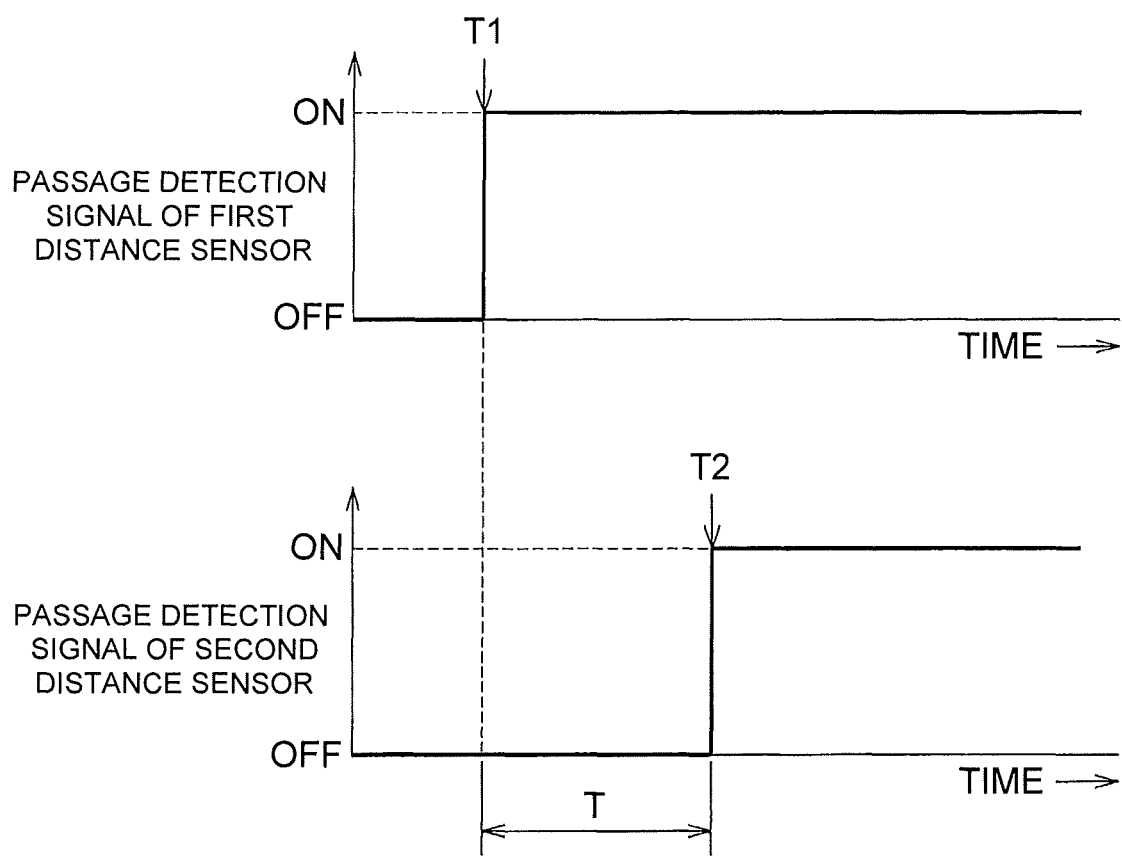
FIG. 8 is graphs showing forklift detecting timings of the respective distance sensors.

FIG. 8 is graphs showing forklift detecting timings of the respective distance sensors 71, 72. In FIG. 8, a passage detection signal is output from the first distance sensor 71 (the output changes from OFF to ON) at a timing T1. In other words, the forklift 10 starts to pass through the front side of the first distance sensor 71 at the timing T1. A passage detection signal is output from the second distance sensor 72 (the output changes from OFF to ON) at a timing T2. In other words, the forklift 10 starts to pass through the front side of the second distance sensor 72 at the timing T2. The time gap between these timings is T. When the dimension of interval (pitch) between the first distance sensor 71 and the second distance sensor 72 is D [mm], the speed v [mm/sec] of the forklift 10 can be calculated by the following Formula (3). The dimension of interval D is a predetermined value.

$$v = D/T \quad (3)$$

Calculation of Conversion Coefficient

The conversion coefficients are calculated as follows.

In this embodiment, the depth is zero when the forklift 10 travels on the travel path F1 at a center position in the horizontal direction orthogonal to the extension direction of the travel path F1 (see FIG. 7). In this embodiment, the depth has a negative value when the forklift 10 passes through a position closer to the first QR-code imaging unit 31 (a position closer to the first QR-code imaging unit 31 relative to the center position), and the depth has a positive value when the forklift 10 passes through a position closer to the second QR-code imaging unit 32 (a position closer to the second QR-code imaging unit 32 relative to the center position).

Specifically, when the cameras 35a to 35d of the first QR-code imaging unit 31 take images, the object appears larger in the image taken as the position of the passage of the forklift 10 is closer to the first QR-code imaging unit 31 (as the absolute value of the depth that is a negative value is larger). Thus, the actual length in one pixel of the image (the actual length of the object appearing in one pixel) is shorter. Conversely, the object appears smaller in the image taken as the position of passage of the forklift 10 is farther away from the first QR-code imaging unit 31 (as the absolute value of the depth that is a positive value is larger). Thus, the actual length in one pixel of the image is longer. With these properties taken into account, the conversion coefficient k is calculated by the following Formula (4):

$$k = S/S0 \quad (4)$$

Here, symbol S is the length of one pixel at the depth of imaging and the unit is mm/pixel as described above. Symbol S0 is the length of one pixel [mm/pixel] when the depth is zero. According to Formula (4), when the forklift 10 travels on the travel path F1 at the center position in the horizontal direction orthogonal to the extension direction of the travel path F1, the length of one pixel S at the depth of imaging and the length S0 of one pixel when the depth is zero become equal to each other, yielding a conversion coefficient k of 1. The length of one pixel S at the depth of imaging can be obtained from a predetermined computational formula or a map based on the imaging distance obtained by the distance sensors 71, 72.

When the forklift 10 passes through a position closer to the first QR-code imaging unit 31, the depth has a negative value, and the length of one pixel S at the depth of imaging becomes smaller than the length of one pixel S0 when the depth is zero, yielding a conversion coefficient k that is smaller than 1. The conversion coefficient k in this case becomes smaller as the absolute value of the depth becomes larger (as the traveling position of the forklift 10 becomes closer to the first QR-code imaging unit 31). Conversely, when the forklift 10 passes through a position closer to the second QR-code imaging unit 32 (when the forklift 10 passes through a position farther away from the first QR-code imaging unit 31), the depth has a positive value, and the length of one pixel S at the depth of imaging becomes longer than the length of one pixel S0 when the depth is zero, yielding a conversion coefficient k that is larger than 1. The conversion coefficient k in this case becomes larger as the absolute value of the depth becomes larger (as the traveling position of the forklift 10 becomes farther away from the first QR-code imaging unit 31).

The origin offset amounts p, q in the above Formulae (1) and (2) are the origin offset amounts when the depth is zero, and are preset values. Thus, when the depth is zero, the second term on the right side of Formula (1) is p, and the second term on the right side of Formula (2) is q.

In this way, the speed v of the forklift 10 and the conversion coefficient k according to the depth (the conversion coefficient k1 relating to the x-y coordinate system and the conversion coefficient k2 relating to the X-Y coordinate system) are obtained. These values are applied to the above Formulae (1) and (2) to calculate the stack-of-loads coordinate point (An, Bm) in the X-Y coordinate system converted from the QR-code coordinate point (an, bm) in the x-y coordinate system. Thus, as described above, either information that the QR code QRC has been appropriately read or information that the QR code QRC has not been appropriately read, is associated with each of the QR-code coordinate point (an, bm) before conversion and the stack-of-loads coordinate point (An, Bm) after conversion. For each QR-code coordinate point (an, bm), it has been determined whether or not the QR code QRC located at that QR-code coordinate point (an, bm) has been appropriately read. Therefore, by converting each QR-code coordinate point (an, bm) into the stack-of-loads coordinate point (An, Bm), it is possible to identify, in the image of the entire stack of loads, the coordinate points of those QR codes QRC that have been appropriately read and the coordinate points of those QR codes QRC that have not been appropriately read, and then to create an unreadable label identifying image in which information on the coordinate points of those QR codes QRC that have been appropriately read (circles in this embodiment) is displayed over the image of the entire stack of loads. Thus, an unreadable label identifying image in which the coordinate points of those QR codes QRC that have been appropriately read and the coordinate points of those QR codes QRC that have not been appropriately read are displayed in different forms of display, is created, and this unreadable label identifying image is displayed on the monitor device 9.

Figure 9:
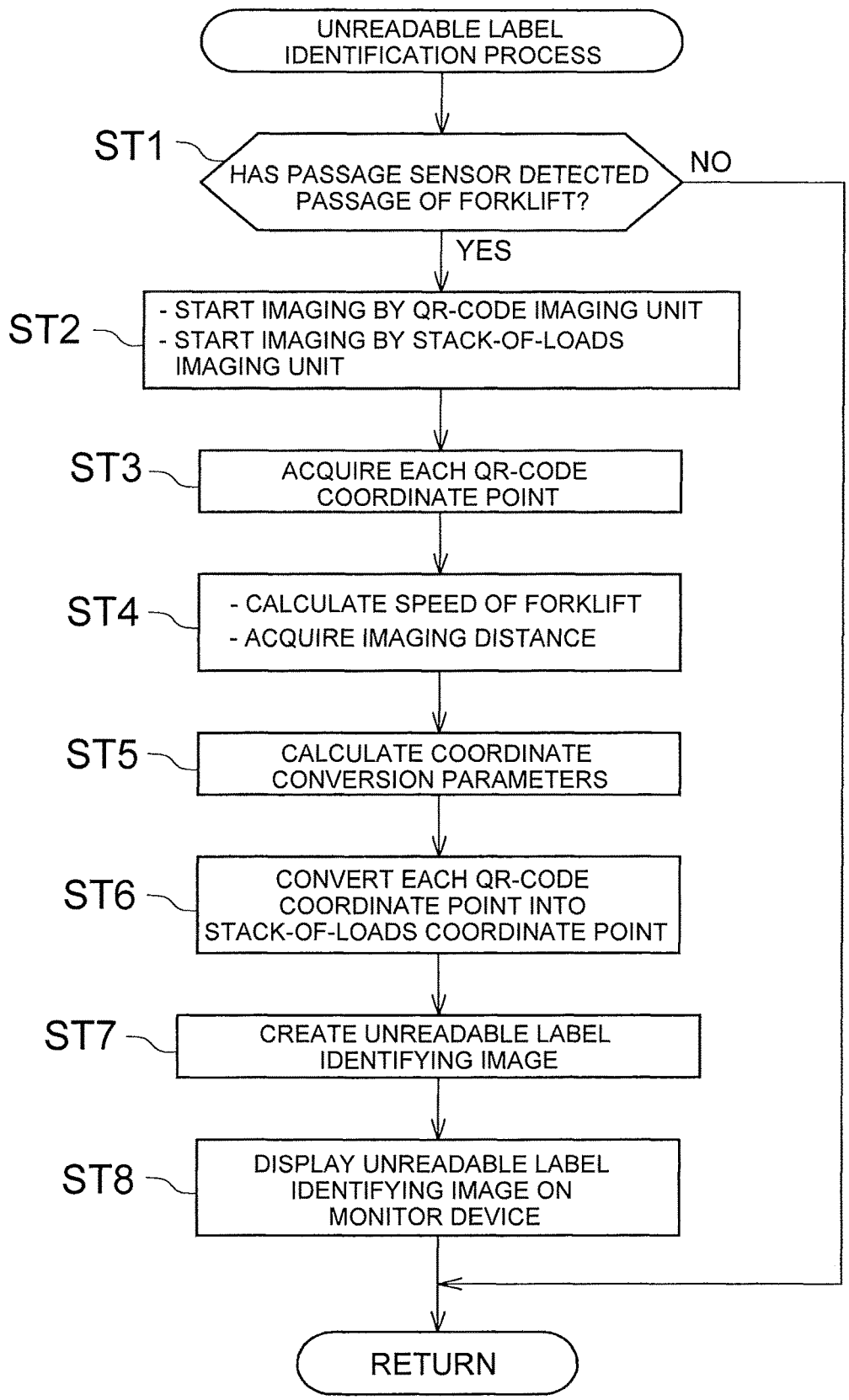
FIG. 9 is a flowchart showing the procedure of an unreadable label identification process.

Next, the procedure of the unreadable label identification process performed by the label reading system 1 configured as has been described above will be described with reference to the flowchart of FIG. 9.

First, as shown in FIG. 1, a driver drives the forklift 10 so as to travel on the travel path F1, with the skids Sk, Sk placed on the forklift 10 and transferred. In this embodiment, the driver transfers the skids Sk, Sk toward the label reading area A by moving the forklift 10 backward on the travel path F1.

When the forklift 10 passes through the installation position of the passage sensor 6 (the front side of the passage sensor 6) on the travel path F1, the passage sensor 6 detects the passage of the forklift 10. (In the flowchart of FIG. 9, the label reading system 1 determines "Yes" in step ST1.) Accordingly, the imaging control device 5 receives a passage detection signal from the passage sensor 6.

Upon receiving the passage detection signal, the imaging control device 5 sends an activation command signal to each of the imaging units 31, 32, 41, 42. Upon receiving the activation command signal, the imaging units 31, 32, 41, 42 start imaging by the cameras 35*a* to 35*d*, 36*a* to 36*d*, 45, 46 (step ST2). Specifically, the cameras 35*a* to 35*d*, 36*a* to 36*d* of the QR-code imaging units 31, 32 image the QR codes QRC, QRC, . . . in the labels La, La, . . . attached to the respective parts boxes 2, 2, . . . on the skids Sk, Sk (see FIG. 4 and FIG. 5 for the images taken). The cameras 45, 46 of the stack-of-loads imaging units 41, 42 image the entire skids Sk, Sk (see FIG. 6 for the images taken). Information on these images taken is sent to the information processing terminal 8.

The information processing terminal 8 acquires the QR-code coordinate points based on the information on the images received from the cameras 35*a* to 35*d*, 36*a* to 36*d* of the QR-code imaging units 31, 32 (step ST3). The information processing terminal 8 calculates the speed v of the forklift 10 based on the passage detection signals received from the distance sensors 71, 72, and acquires the imaging distance (the distance from the labels La to the cameras 35*a* to 35*d*, 36*a* to 36*d*) (step ST4).

The information processing terminal 8 calculates coordinate conversion parameters (the above-described values k1, k2, p, q, t, Np, H, M, and S) used in the above Formulae (1) and (2) (step ST5).

Thereafter, the information processing terminal 8 converts the QR-code coordinate points in the x-y coordinate system into the stack-of-loads coordinate points in the X-Y coordinate system by using the above Formulae (1) and (2) (step ST6). Thus, the stack-of-loads coordinate points (An, Bm) are calculated from the QR-code coordinate points (an, bm). Specifically, for each QR-code coordinate point (an, bm), it has been determined whether or not the QR code QRC located at that QR-code coordinate point (an, bm) has been appropriately read. Therefore, by converting each QR-code coordinate point (an, bm) into the stack-of-loads coordinate point (An, Bm), it is possible to identify, in the image of the entire stack of loads, the coordinate points of those QR codes QRC that have been appropriately read and the coordinate points of those QR codes QRC that have not been appropriately read.

Figure 10:
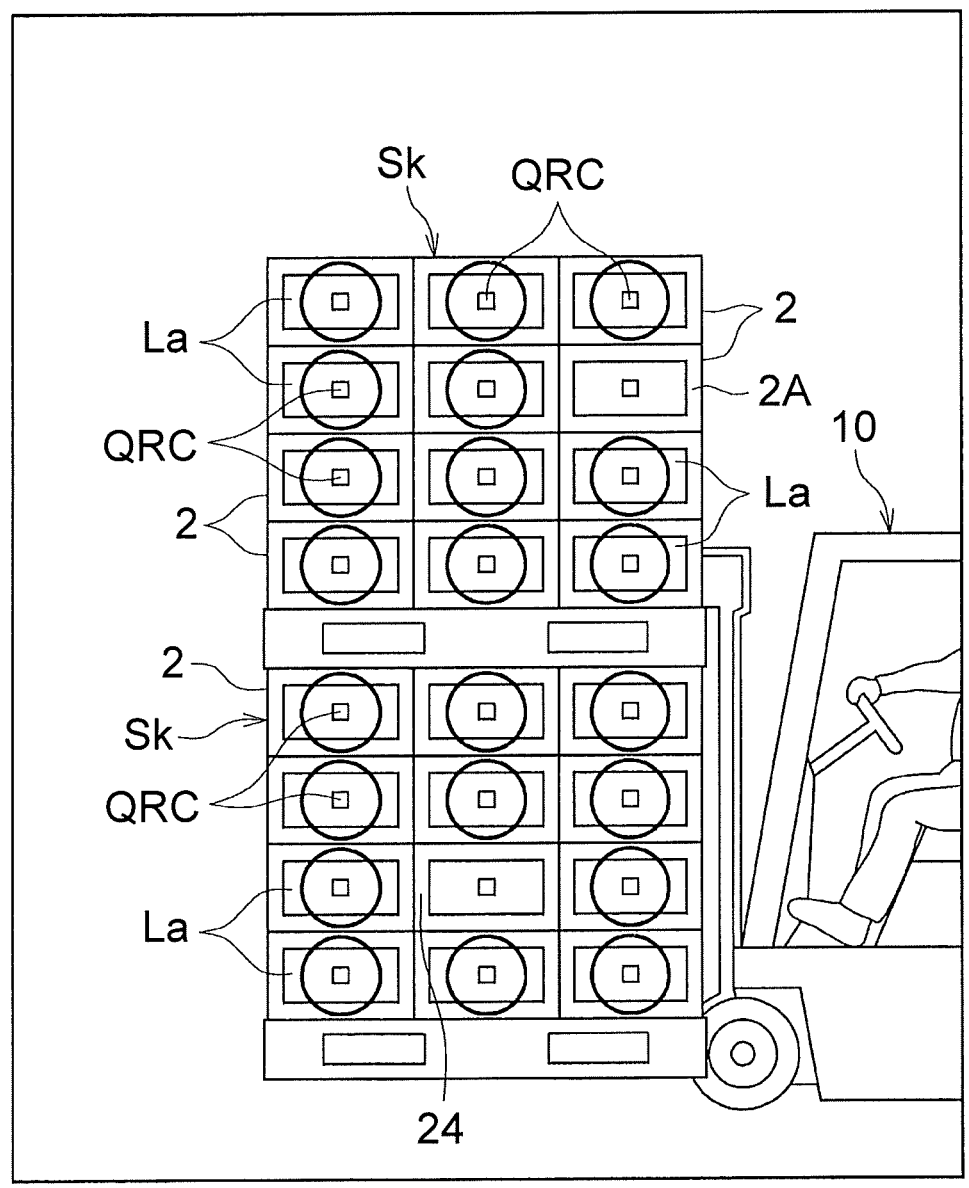
FIG. 10 is a view showing an unreadable label identifying image obtained by the unreadable label identification process.

Thereafter, the information processing terminal 8 creates an unreadable label identifying image that allows one to identify, for each coordinate point of the QR code QRC after conversion (stack-of-loads coordinate point (An, Bm)), whether the QR code QRC corresponding to that coordinate point has been appropriately read or has not been appropriately read (step ST7). FIG. 10 shows this unreadable label identifying image. In this unreadable label identifying image, circles are displayed over the labels La of which the QR codes QRC have been appropriately read, while no circles are displayed over the labels La of which the QR codes QRC have not been appropriately read. In FIG. 10, no circles are displayed over the parts box (fourth parts box) 24 at the center in the second row from below and a parts box 2A at a right end of the second row from above, and these parts boxes 24, 2A are parts boxes of which the QR codes QRC have not been appropriately read.

Then, the information processing terminal 8 sends information on this unreadable label identifying image to the monitor device 9, and causes the monitor device 9 to display this unreadable label identifying image (step ST8).

By visually checking the unreadable label identifying image, a worker can learn the number and the positions of the parts boxes 2 of which the QR codes QRC have not been appropriately read.

Effects of Embodiment

As has been described above, in this embodiment, based on information on a plurality of images taken by the cameras 35*a* to 35*d*, 36*a* to 36*d* of the QR-code imaging device 3, either information that the information of the labels La, La, . . . (the information of the QR codes QRC, QRC, . . . ) has been appropriately acquired or information that the information of the labels La, La, . . . has not been appropriately read is assigned to each of the parts boxes 2, 2, . . . placed on the forklift 10, and then the information assigned to each of the parts boxes 2, 2, . . . is displayed over a corresponding one of the parts boxes 2, 2, . . . in an image showing the parts boxes 2, 2, . . . . By visually checking the image showing the parts boxes 2, 2, . . . (unreadable label identifying image), a worker can easily recognize the parts boxes 2, 2, . . . of which the information of the labels La, La, . . . has not been appropriately acquired.

When there are parts boxes 2, 2, . . . of which the information of the labels La, La, . . . has not been appropriately acquired, for example, the worker performs an operation of manually reading the labels of these parts boxes 2, 2, . . . .

In this embodiment, the label reading system 1 is equipped with the QR-code imaging device 3 and the stack-of-loads imaging device 4, and can easily acquire an image showing the parts boxes 2, 2, . . . by the cameras 45, 46 of the stack-of-loads imaging device 4 while being able to read each of the labels La, La, . . . with high precision by the cameras 35*a* to 35*d*, 36*a* to 36*d* of the QR-code imaging device 3. Thus, the means for reading the labels La, La, . . . and acquiring the information of the labels La, La, . . . and the means for acquiring an image showing the parts boxes 2, 2, . . . are separately provided (the functions are divided between the imaging devices 3, 4), which can enhance the usefulness of the label reading system 1.

Second Embodiment

Next, a second embodiment will be described. In this embodiment, how to calculate the speed v of the forklift 10 and the length of one pixel S at the depth of imaging (hereinafter also referred to simply as the length of one pixel) is different from that in the first embodiment. As the other configurations and processes (unreadable label identification process etc.) are the same as in the first embodiment, only how to calculate the speed v of the forklift 10 and the length of one pixel S at the depth of imaging will be described here.

Calculation of Speed of Forklift

The speed v of the forklift 10 in this embodiment is calculated as follows.

Figure 11:
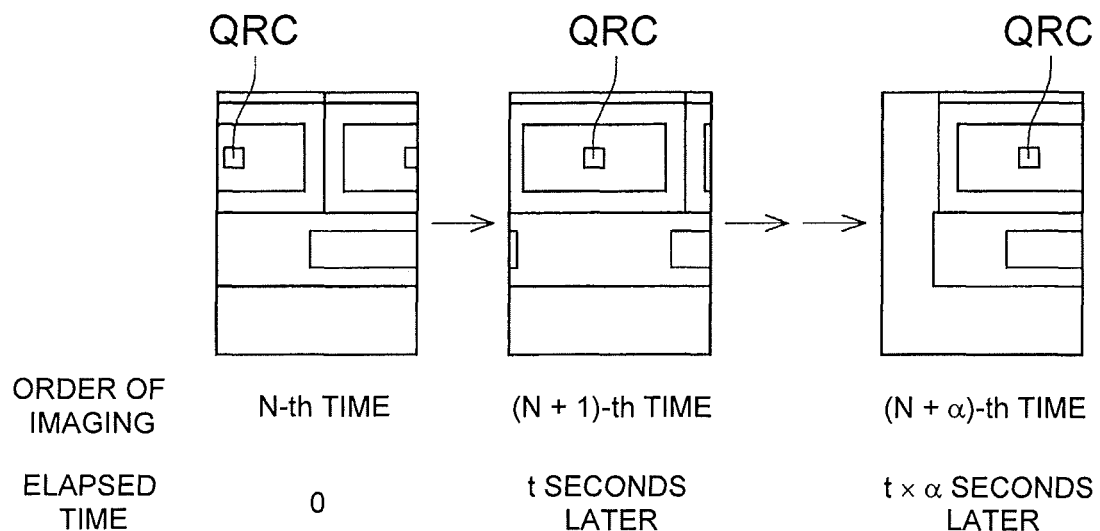
FIG. 11 is a view showing, in order of imaging, images taken by one camera of the QR-code imaging unit in a second embodiment.
Figure 12:
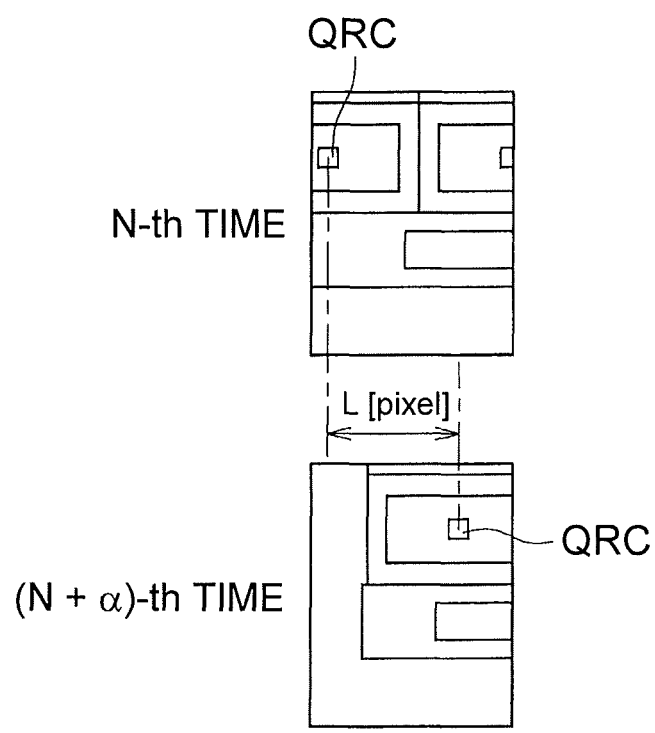
FIG. 12 is a view showing an image taken at an N-th time and an image taken at an (N+α)-th time in order of imaging, alongside each other.

FIG. 11 is a view showing, in order of imaging, images taken by one camera of the QR-code imaging unit (e.g., the first camera 35a of the first QR-code imaging unit 31) in this embodiment. In FIG. 11, the images taken by the first camera 35a are arranged in order of imaging (from left to right in order of imaging time). Specifically, the image on the left side is an N-th image taken by the first camera 35a (taken at the N-th time); the image at the center is an (N+1)-th image taken by the first camera 35a (taken at the (N+1)-th time); and the image on the right side is an (N+α)-th image taken by the first camera 35a (taken at the (N+α)-th time). The timing of imaging of the (N+1)-th image is t seconds after the timing of imaging of the N-th image, and the timing of imaging of the (N+α)-th image is t×α seconds after the timing of imaging of the N-th image. FIG. 12 is a view showing the N-th image (taken at the N-th time) and the (N+α)-th image (taken at the (N+α)-th time) in order of imaging, alongside each other. As shown in FIG. 12, a comparison between these images shows that the same QR code QRC has moved an amount L [pixel].

When images showing a relative movement of the same QR code QRC at predetermined time intervals (t-second intervals) are thus acquired, the speed v [mm/sec] of the forklift 10 can be calculated by the following Formula (5):

$$v = L \cdot S / t \cdot \alpha \quad (5)$$

Here, symbol L is an amount of movement from the position of the QR code QRC in the image taken at the N-th time to the position of the QR code QRC in the image taken at the (N+α)-th time, and the unit is pixel. As described above, symbol S is the length of one pixel at the depth of imaging and the unit is mm/pixel.

Calculation of Length of One Pixel at Depth of Imaging

The length of one pixel S at the depth of imaging in this embodiment is calculated as follows.

The length of one pixel S [mm/pixel] is calculated by Formula (6) below by using the length Q [mm] of one side of the QR code QRC, and the number of pixels Pn [pixel] per side of the QR code QRC obtained by image processing.

$$S = Q / Pn \quad (6)$$

Figure 13:
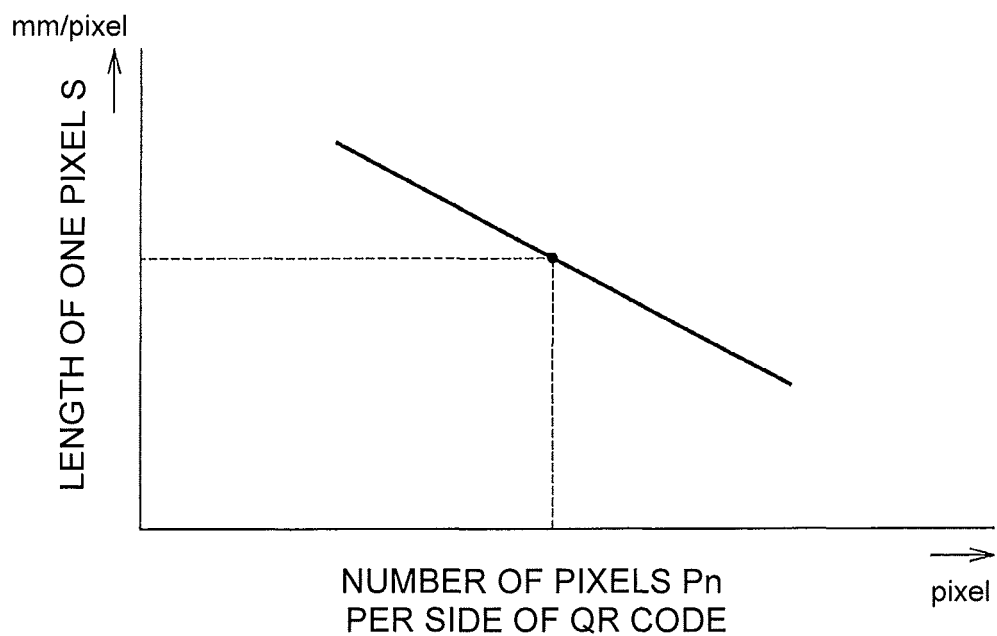
FIG. 13 is a graph showing a relation between the number of pixels per side of a QR code and the length of one pixel.

The relation between the length of one pixel S and the number of pixels Pn per side of the QR code QRC in this case is as shown in FIG. 13. Thus, it is also possible to make a map out of FIG. 13 and store the map in the ROM of the information processing terminal 8 so as to be able to obtain the length of one pixel S by referring to this map.

In this embodiment, the conversion coefficient k is calculated by applying the length of one pixel S obtained as described above to the above Formula (4), and the speed v of the forklift 10 calculated as described above is used. Thus, the QR-code coordinate point (an, bm) in the x-y coordinate system is converted into the stack-of-loads coordinate point (An, Bm) in the X-Y coordinate by the above Formulae (1) and (2).

Third Embodiment

Next, a third embodiment will be described. Also in this embodiment, how to calculate the length of one pixel S at the depth of imaging and the speed v of the forklift 10 is different from that in the first embodiment. As the other configurations and processes (unreadable label identification process etc.) are the same as in the first embodiment, only how to calculate the length of one pixel S at the depth of imaging and the speed v of the forklift 10 will be described here. In this embodiment, the length of one pixel S at the depth of imaging is calculated without using the distance sensors 71, 72.

In the following, a case will be described where the length of one pixel S at the depth of imaging and the speed v of the forklift 10 are calculated based on an image taken of the forklift 10 from the far side in FIG. 1 (based on an image taken by the first camera 36a of the second QR-code imaging unit 32).

Calculation of Length of One Pixel at Depth of Imaging

The length of one pixel S at the depth of imaging in this embodiment is calculated as follows.

Figure 14:
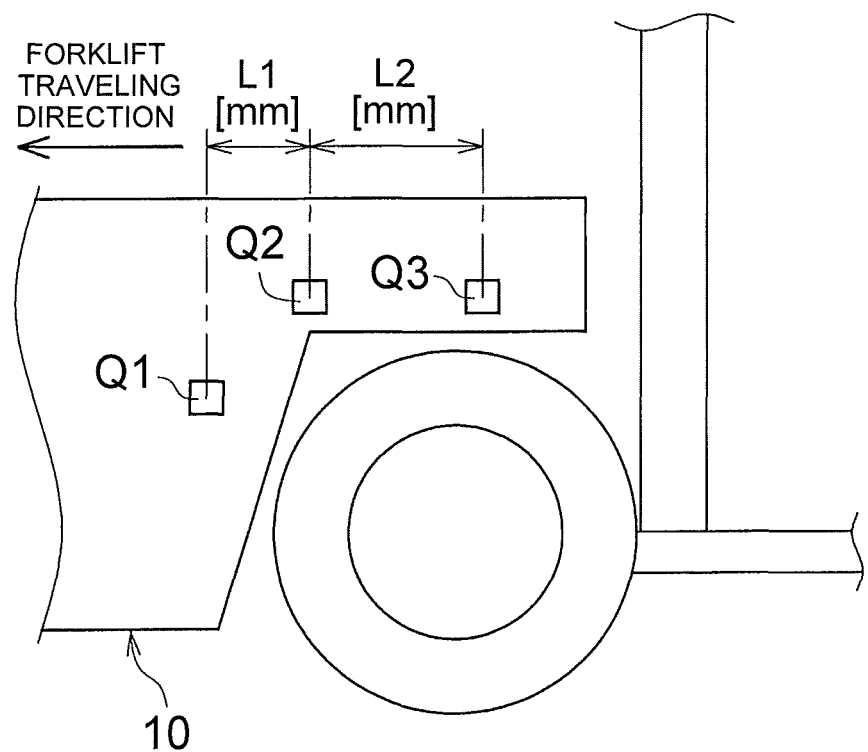
FIG. 14 is a view showing a plurality of QR codes attached to the forklift and a part surrounding these QR codes in a third embodiment.

First, as shown in FIG. 14, QR codes Q1, Q2, Q3 are attached to three positions on a side surface of the forklift 10. These QR codes Q1, Q2, Q3 are referred to as a first QR code Q1, a second QR code Q2, and a third QR code Q3 from a rear side of the forklift 10 (from the side farther away from the skid Sk). The dimension of interval (pitch) between the first QR code Q1 and the second QR code Q2 in the horizontal direction (a front-rear direction of the forklift 10) is L1 [mm], and the dimension of interval between the second QR code Q2 and the third QR code Q3 in the horizontal direction (the front-rear direction of the forklift 10) is L2 [mm]. The latter dimension of interval L2 is set to be larger than the former dimension of interval L1 by a predetermined dimension. Height positions at which the QR codes Q1, Q2, Q3 are attached are set to such positions that the QR codes Q1, Q2, Q3 can be imaged by the same camera (e.g., the first camera 36a) (positions inside the imaging field of view of the first camera 36a in the vertical direction).

Figure 15:
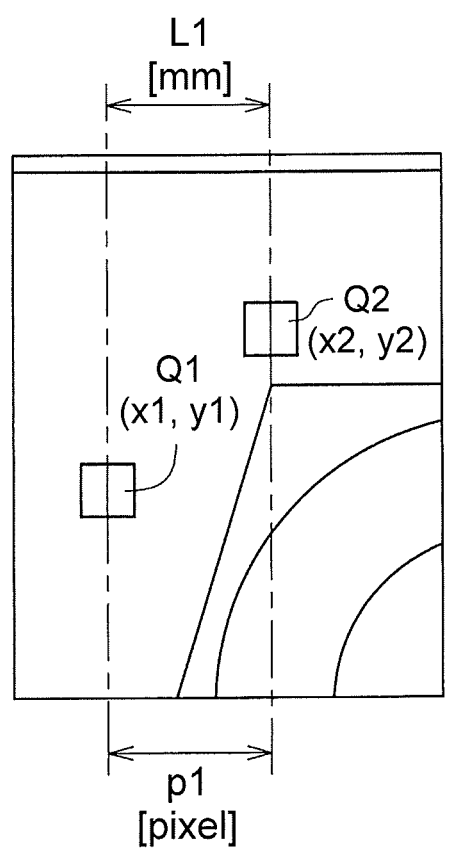
FIG. 15 is a view showing an image taken of first and second QR codes attached to the forklift.

As shown in FIG. 15, the camera (e.g., the first camera 35a) of the QR-code imaging unit (e.g., the first QR-code imaging unit 31) takes an image at a timing when both the first QR code Q1 and the second QR code Q2 can be imaged. In other words, an image is taken at a timing when the first QR code Q1 and the second QR code Q2 are located inside the same imaging field of view.

Then, the length of one pixel S is calculated by the following Formula (7):

$$S = L1 / p1 \quad (7)$$

Here, symbol p1 is the number of pixels between the center position of the first QR code Q1 and the center position of the second QR code Q2 in the image taken.

Calculation of Speed of Forklift

The speed v of the forklift 10 in this embodiment is calculated as follows.

Figure 16A:
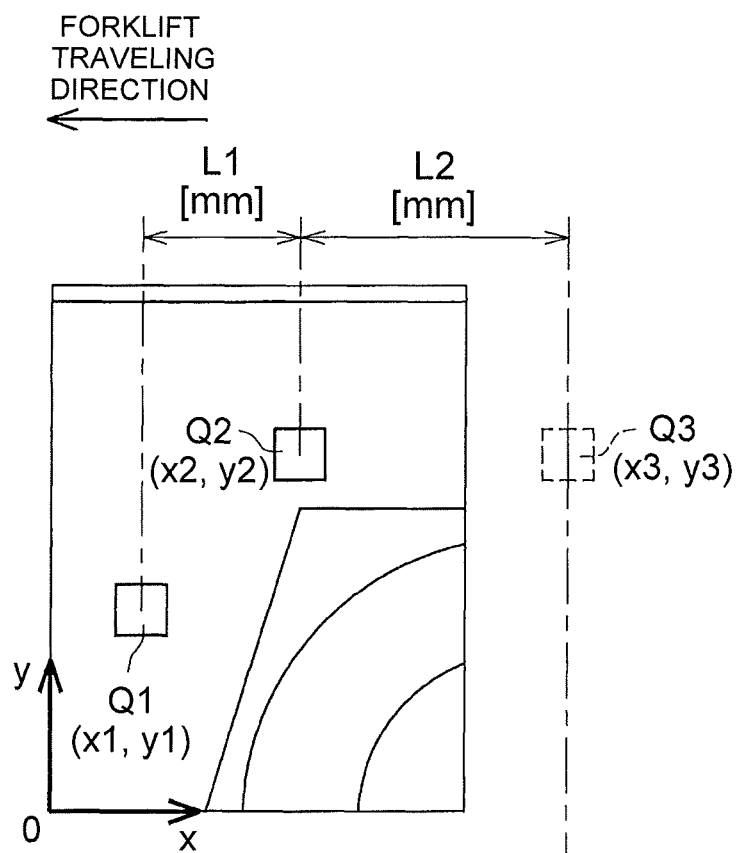
FIG. 16A is a view illustrating how to calculate the speed of the forklift in the third embodiment.
Figure 16B:
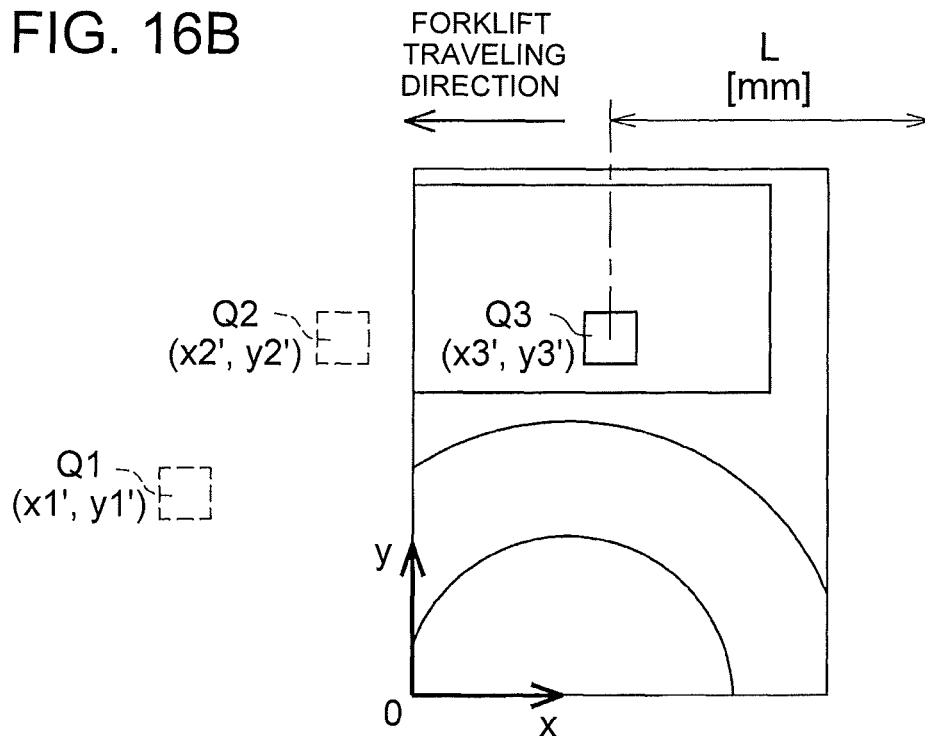
FIG. 16B is a view illustrating how to calculate the speed of the forklift in the third embodiment.

FIG. 16A and FIG. 16B are views illustrating how to calculate the speed v of the forklift 10 in this embodiment. FIG. 16A shows an image that is the same as in FIG. 15, i.e., an image taken at a timing when the first QR code Q1 and the second QR code Q2 are located inside the same imaging field of view. (In FIG. 16A, the position of the third QR code Q3 located outside the image is indicated by the dashed line.) This image is an image taken at the N-th time.

FIG. 16B is an image taken at a timing when the third QR code Q3 can be imaged. (In FIG. 16B, the positions of the first QR code Q1 and the second QR code Q2 located outside the image are indicated by the dashed lines). This image is an image taken at the (N+α)-th time.

When a lower left end of the image shown in FIG. 16A is taken as the origin o of the x-y coordinate system, and the x-coordinate of the first QR code Q1 is x1 [pixel] and the x-coordinate of the third QR code Q3 is x3, there is a relation expressed by Formula (8) below between these coordinates and the length of one pixel S. Symbol x3 in Formula (8) is the distance [mm] of the center position of the third QR code Q3 from the origin o in a direction along the x-axis direction. The x-coordinate x1 (coordinate value) is obtained as the coordinate point of the center position of the first QR code Q1 based on image information output from the camera (e.g., the first camera 36a) of the QR-code imaging unit (e.g., the second QR-code imaging unit 32).

$$x3 = x1 \cdot S + L1 + L2 \tag{8}$$

In the image shown in FIG. 16B, when the x-coordinate of the third QR code Q3 is x3' [pixel], there is a relation expressed by the following Formula (9) among each coordinate, the amount of travel L [mm] of the forklift 10, and the length of one pixel S:

$$L = x3 - x3' \cdot S = S(x1 - x3')S + L1 + L2 \tag{9}$$

The speed v [mm/sec] of the forklift 10 can be calculated from the amount of travel L and the time t·α taken to make that amount of travel L, and therefore can be calculated by the following Formula (10):

$$v = L/t \cdot \alpha = \{S(x1 - x3') + L1 + L2\}/t \cdot \alpha \tag{10}$$

In this embodiment, the conversion coefficient k is calculated by applying the length of one pixel S obtained as described above to the above Formula (4), and the speed v of the forklift 10 calculated as described above is used. The conversion coefficient k and the speed v of the forklift 10 are applied to the above Formulae (1) and (2) to thereby convert the QR-code coordinate point (an, bm) in the x-y coordinate system into the stack-of-loads coordinate point (An, Bm) in the X-Y coordinate system.

Fourth Embodiment

Next, a fourth embodiment will be described. In this embodiment, images taken by the QR-code imaging units 31, 32 are combined to create an unreadable label identifying image without requiring the above-described coordinate point conversion process.

To combine (join together) images, it is necessary to adjust the position of joining together the images according to the speed v of the forklift 10 and the imaging distance. Therefore, an x-y coordinate point (xN, yN) of a position at which attaching of an N-th image (N-th image from the origin o) is started when images are sequentially joined together is calculated by the following Formulae (11) and (12):

$$xN[\text{pixel}] = (Np) \cdot v \cdot t / S \tag{11}$$

$$yN[\text{pixel}] = (M-1) \cdot H / S \tag{12}$$

As described above, when the surface located on the near side in FIG. 1 is the object, Np becomes (Nmax−N), and when the surface located on the far side in FIG. 1 is the object, Np becomes (N−1). Symbol M is the camera number (the cameras 35a to 35d are numbered from bottom to top). The unit of the x-y coordinate point (xN, yN) obtained by Formulae (11) and (12) is pixel. Thus, it is possible to create an image that does not contain duplicate labels La by combining (joining together) images (images taken by the cameras 35a to 35d), with the x-y coordinate points obtained by Formulae (11) and (12) defined as the positions (e.g., the positions of left ends of the images) at which attaching of the respective images is started.

Figure 17:
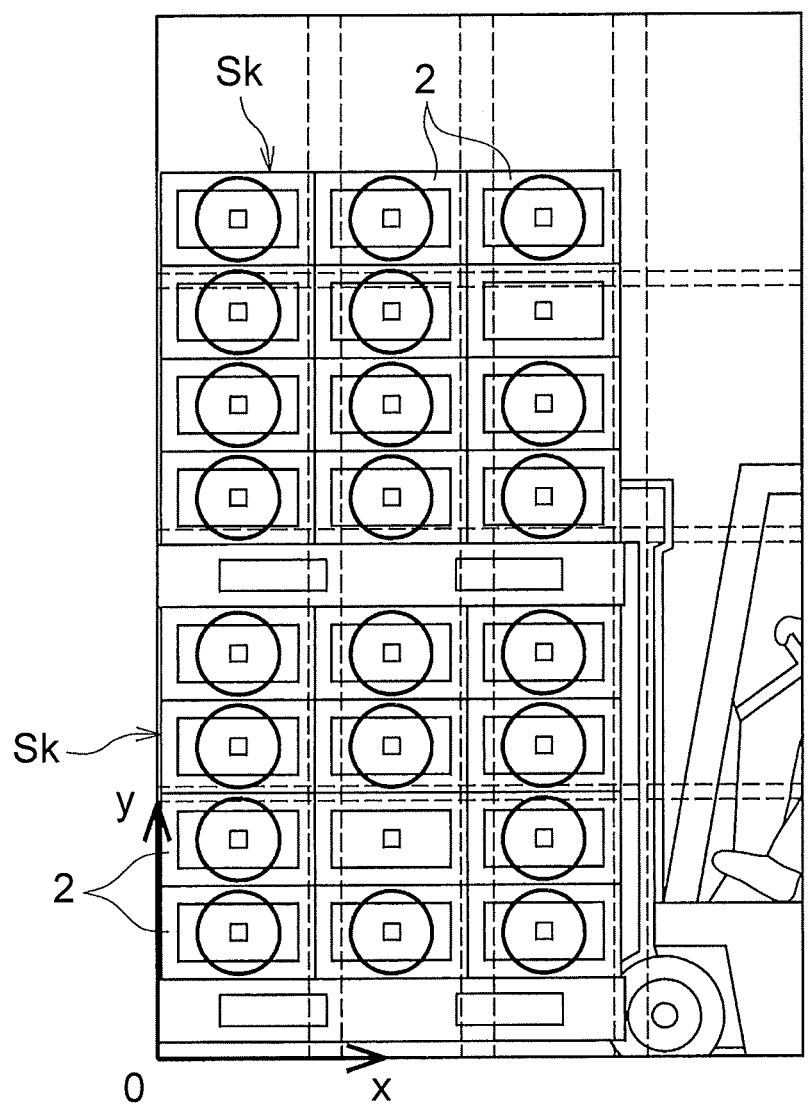
FIG. 17 is a view showing an unreadable label identifying image obtained in a fourth embodiment.

FIG. 17 is a view showing an unreadable label identifying image obtained by this process. The dashed lines in FIG. 17 represent outer edges of the images, and the length of overlap between adjacent images is adjusted according to the x-y coordinate points calculated by the above Formulae (11) and (12).

This image processing corresponds to the process described in the present disclosure as follows "performing an image combining process of combining a plurality of images taken by the label imaging devices into an image in which the same labels are superimposed on each other such that the image does not contain duplicate labels, and then display information on each of the loads to which either the information that the label information has been appropriately acquired or the information that the label information has not been appropriately acquired is assigned, over a corresponding load in the created image."

This embodiment can eliminate the need for the above-described coordinate point conversion process, and can thereby simplify the process for creating an unreadable label identifying image.

Fifth Embodiment

Next, a fifth embodiment will be described. In the above embodiments, circles are displayed in an unreadable label identifying image over the labels La of which the QR codes QRC have been appropriately read, while no circles are displayed over the labels La of which the QR codes QRC have not been appropriately read.

Actions from reading the QR code QRC to cross-checking (against the order information) specifically include: an action of detecting that there is a QR code QRC based on information from a camera (hereinafter referred to as QR-code detection); an action of reading the information written in the QR code QRC (hereinafter referred to as QR-code recognition); and an action of cross-checking the information obtained by reading the QR code QRC against the order information (hereinafter referred to as cross-checking). In the above embodiments, circles are displayed in an unreadable label identifying image over those QR code QRC for which all of these QR-code detection, QR-code recognition, and cross-checking have been appropriately performed (for which the presence of the QR code QRC has been detected, the information written in the QR code QRC has been read, and the information has matched the order information).

In this embodiment, instead, distinction is made between a case where both QR-code detection and QR-code recognition have been performed (the presence of the QR code QRC has been detected and the information written in the QR code has been read) but cross-checking has not been appropriate (the information read from the QR code has not matched the order information), and a case where QR-code detection has not been performed (the presence of the QR code QRC has not been detected), and different forms of display are used for these cases in an unreadable label identifying image.

Examples of the case where "the information read from the QR code has not matched the order information" here include a case where the wrong parts have been delivered and a case where information different from the correct information has been acquired due to the QR code QRC being unclean etc.

In this embodiment, when all of QR-code detection, QR-code recognition, and cross-checking have been appropriately performed, circles are displayed over an unreadable label identifying image as in the above embodiments.

On the other hand, when both QR-code detection and QR-code recognition have been performed but cross-checking has not been appropriate, crosses are displayed over an unreadable label identifying image. When QR-code recognition has been performed, the presence of the QR code QRC is guaranteed while it becomes certain that cross-checking has failed to be appropriately performed. The purpose of this display is therefore to let a worker know that there is some problem (such as the wrong parts having been delivered or the QR code QRC being unclean).

When QR-code detection has not been performed, no information to that effect is displayed in an unreadable label identifying image (no marks are displayed). This is because QR-code detection has not been performed in the first place (even the presence or absence of the QR code QRC has not been detected) and information about whether or not the QR code has been successfully read is not available, either.

Thus, this embodiment allows one to easily recognize the state of reading of the QR code QRC and cross-checking by visually checking the unreadable label identifying image.

Other Embodiments

The present disclosure is not limited to the above embodiments, and any modifications or applications of the disclosure within the scope of claims and a scope equivalent to the scope of claims are possible.

For example, the above embodiments have been described as to the case where the present disclosure is applied as a system that reads the QR codes QRC, QRC, . . . in the labels La, La, . . . attached to the delivered parts boxes 2, 2, . . . in an automobile production factory. The present disclosure is not limited to this example but may also be used as a label reading system used in a factory other than an automobile production factory. The information presenting portion of the label La is not limited to a QR code but may also be a barcode.

In the above embodiments, the label reading system 1 that reads the labels La, La in the case where two parts boxes 2, 2 are placed side by side in the horizontal direction orthogonal to the traveling direction of the forklift 10 has been described as an example. Specifically, the two QR-code imaging units 31, 32 and the two stack-of-loads imaging units 41, 42 are installed in the label reading system 1. The present disclosure is not limited to this example but can also be applied to a label reading system that reads labels in a case where one parts box is placed in the horizontal direction orthogonal to the traveling direction of the forklift 10. In this case, the QR-code imaging unit and the stack-of-loads imaging unit are installed only on a side where the label is attached.

In the above embodiments, the QR-code imaging units 31, 32 and the stack-of-loads imaging units 41, 42 take images from the horizontal direction to read the labels La attached to the side surfaces of the parts boxes 2. The present disclosure is not limited to this example, and a QR-code imaging unit and a stack-of-loads imaging unit that image labels from the upper side may be provided to read the labels La applied to upper surfaces of the parts boxes 2. In this case, an image showing a plan view of the stack of loads is also created as an unreadable label identifying image.

In the above embodiments, the passage sensor 6 and the distance sensors 71, 72 each have the light projector-receiver provided on one side of the travel path F1. The present disclosure is not limited to this example, and a light projector and a light receiver may be disposed respectively on one side and the other side of the travel path F1.

In the above embodiments, the case where the skids Sk, Sk are transferred by the forklift 10 has been described as an example. The present disclosure is not limited to this example but can also be applied to a case where skids are transferred by a conveyor belt. In the case where skids are transferred by a conveyor belt, the transfer speed is constant (fixed speed) and the imaging distance is also constant (fixed imaging distance). Therefore, the speed v and the length of one pixel S can be set as initial parameters, and the need for calculating the coordinate conversion parameters by using the distance sensors 71, 72 or performing image processing can be eliminated.

The present disclosure is applicable to a label reading system that reads QR codes in labels attached to parts boxes being transferred by a forklift.

What is claimed is:

1. A label reading system in which labels respectively attached to those surfaces of a plurality of loads placed on a transfer vehicle that extend in a direction along a traveling direction of the transfer vehicle are read as the transfer vehicle passes through a label reading area, the label reading system comprising:
a group of label imaging devices that is installed in the label reading area, that includes a plurality of label imaging devices each configured to image some of the labels attached to the respective loads, and that is configured to be able to image all the labels of the loads when the loads have passed through the label reading area;
a stack-of-loads imaging device that images a plurality of loads placed on the transfer vehicle as one image; and
a label information integrating and displaying device that, based on information on a plurality of images taken by the label imaging devices of the group of label imaging devices, assigns either information that label information has been appropriately acquired or information that the label information has not been appropriately acquired to each of the loads placed on the transfer vehicle, and then displays the information assigned to each of the loads over a corresponding load in an image showing the loads,
wherein the label information integrating and displaying device is configured to display information on each of the loads to which either the information that the label information has been appropriately acquired or the information that the label information has not been appropriately acquired is assigned, over a corresponding load in an image showing the loads taken by the stack-of-loads imaging device, by performing a coordinate point conversion process that involves arranging images of the loads taken by the label imaging devices of the group of label imaging devices in a coordinate system, and converting a coordinate point of an information presenting portion of the label of each of the loads into a coordinate point of the information presenting portion of the label of the load in an image showing the loads taken by the stack-of-loads imaging device.

2. The label reading system according to claim 1, wherein:
a plurality of loads is placed on the transfer vehicle in a direction along the traveling direction of the transfer vehicle, and the label imaging device sequentially images the labels attached to the respective loads as the transfer vehicle travels and the loads sequentially move into an imaging range of the label imaging device; and
in the coordinate point conversion process, a computational formula having a traveling speed of the transfer vehicle as one of parameters is used to convert the coordinate point of the information presenting portion of the label of each of the loads imaged by the label imaging device into the coordinate point of the information presenting portion of the label of the load in an image showing the loads taken by the stack-of-loads imaging device.

3. The label reading system according to claim 1, wherein the label imaging devices of the group of label imaging devices are disposed along a vertical direction, with each of the label imaging devices having a different imaging field of view in the vertical direction, and are configured such that a label imaging device located at a lowest position images at least a label attached to a load in a bottom tier of a plurality of loads stacked in tiers while a label imaging device located at a highest position images at least a label attached to a load in a top tier of the loads stacked in tiers.

4. A label reading system in which labels respectively attached to those surfaces of a plurality of loads placed on a transfer vehicle that extend in a direction along a traveling direction of the transfer vehicle are read as the transfer vehicle passes through a label reading area, the label reading system comprising:

a group of label imaging devices that is installed in the label reading area, that includes a plurality of label imaging devices each configured to image some of the labels attached to the respective loads, and that is configured to be able to image all the labels of the loads when the loads have passed through the label reading area; and a label information integrating and displaying device that, based on information on a plurality of images taken by the label imaging devices of the group of label imaging devices, assigns either information that label information has been appropriately acquired or information that the label information has not been appropriately acquired to each of the loads placed on the transfer vehicle, and then displays the information assigned to each of the loads over a corresponding load in an image showing the loads, wherein the label information integrating and displaying device is configured to create an image showing a plurality of loads by performing an image combining process of combining a plurality of images taken by the label imaging devices of the group of label imaging devices into an image in which the same labels are superimposed on each other such that the image does not contain duplicate labels, and then display information on each of the loads to which either the information that the label information has been appropriately acquired or the information that the label information has not been appropriately acquired is assigned, over a corresponding load in the created image.

5. The label reading system according to claim 4, wherein:

the plurality of loads is placed on the transfer vehicle in a direction along the traveling direction of the transfer vehicle, and the label imaging device sequentially images the labels attached to the respective loads as the transfer vehicle travels and the loads sequentially move into an imaging range of the label imaging device; and in a coordinate point conversion process, a computational formula having a traveling speed of the transfer vehicle as one of parameters is used to convert a coordinate point of the information presenting portion of the label of each of the loads imaged by the label imaging device into the coordinate point of the information presenting portion of the label of the load in an image showing the loads taken by the stack-of-loads imaging device.

6. The label reading system according to claim 4, wherein the label imaging devices of the group of label imaging devices are disposed along a vertical direction, with each of the label imaging devices having a different imaging field of view in the vertical direction, and are configured such that a label imaging device located at a lowest position images at least a label attached to a load in a bottom tier of a plurality of loads stacked in tiers while a label imaging device located at a highest position images at least a label attached to a load in a top tier of the loads stacked in tiers.

* * * * *